United States Patent [19]

Basham et al.

[11] Patent Number: 5,142,483
[45] Date of Patent: Aug. 25, 1992

[54] PRESSURE REGULATING SYSTEM FOR POSITIVE SHUT-OFF PRESSURE CONTROLLER

[75] Inventors: D. Scott Basham, Tempe, Ariz.; Pierre R. Delajoud, Neuilly sur Seine, France; Martin J. Girard, Phoenix, Ariz.

[73] Assignee: Caltechnix Corporation, Tempe, Ariz.

[21] Appl. No.: 514,659

[22] Filed: Apr. 24, 1990

[51] Int. Cl.⁵ .............................................. G06F 15/20
[52] U.S. Cl. ................................. 364/510; 364/558; 73/861.44
[58] Field of Search ............... 364/510, 558, 569, 165, 364/551.01, 509; 73/199, 861.43, 861.44; 417/279, 290, 295, 301

[56] References Cited

U.S. PATENT DOCUMENTS

| | | | |
|---|---|---|---|
| 4,084,239 | 4/1978 | Anastasia et al. | 364/424 |
| 4,131,015 | 12/1978 | Chawla et al. | 73/199 |
| 4,285,245 | 8/1981 | Kennedy | 73/199 |
| 4,413,526 | 11/1983 | Delajoud | 73/745 |
| 4,679,585 | 7/1987 | Ewing | 137/486 |
| 4,690,163 | 9/1987 | Steinemann | 137/8 |
| 4,720,807 | 1/1988 | Ferran et al. | 364/558 |
| 4,777,383 | 10/1988 | Waller et al. | 307/118 |
| 4,798,521 | 1/1989 | Schmidt et al. | 417/295 |
| 4,816,987 | 3/1989 | Brooks et al. | 364/165 |
| 4,989,160 | 1/1991 | Garrett et al. | 364/509 |
| 5,047,965 | 9/1991 | Zlokovitz | 364/558 |

FOREIGN PATENT DOCUMENTS 0214416 9/1987 Japan.

Primary Examiner—Parshotam S. Lall
Assistant Examiner—Ellis B. Ramirez
Attorney, Agent, or Firm—Cahill, Sutton & Thomas

[57] ABSTRACT

A pressure controller rapidly, precisely sets and stabilizes the pressure in a test volume to a target pressure by opening a fast inlet solenoid valve or a fast outlet solenoid valve, and opening a slow inlet solenoid valve or a slow outlet solenoid valve, to rapidly increase or decrease pressure in the manifold. When the pressure has reached a predetermined level, the fast inlet or fast outlet solenoid valve is closed. Then only the slow inlet or slow outlet solenoid valve remains opened to further increase or decrease the pressure to a second predetermined level. Then, based on the present pressure in the manifold and the test volume, a computation is made of the amount of gas needed to be injected into the manifold to increase the pressure to the target pressure. A computation is made of the time duration during which the slow inlet valve and the slow outlet valve must be differentially opened to increase the net amount of gas injected into the manifold and test volume by the computed amount. Initially, a system configuration program is executed in which the test volume is computed and offsets, pressure rate of change, and other variables are computed to compensate for differences in the turn on and turn off response times of the inlet and outlet solenoid valves. The slow inlet solenoid and the slow outlet solenoid valve are differentially opened for that time duration. Operation to decrease manifold pressure to a target valve is entirely similar.

41 Claims, 9 Drawing Sheets

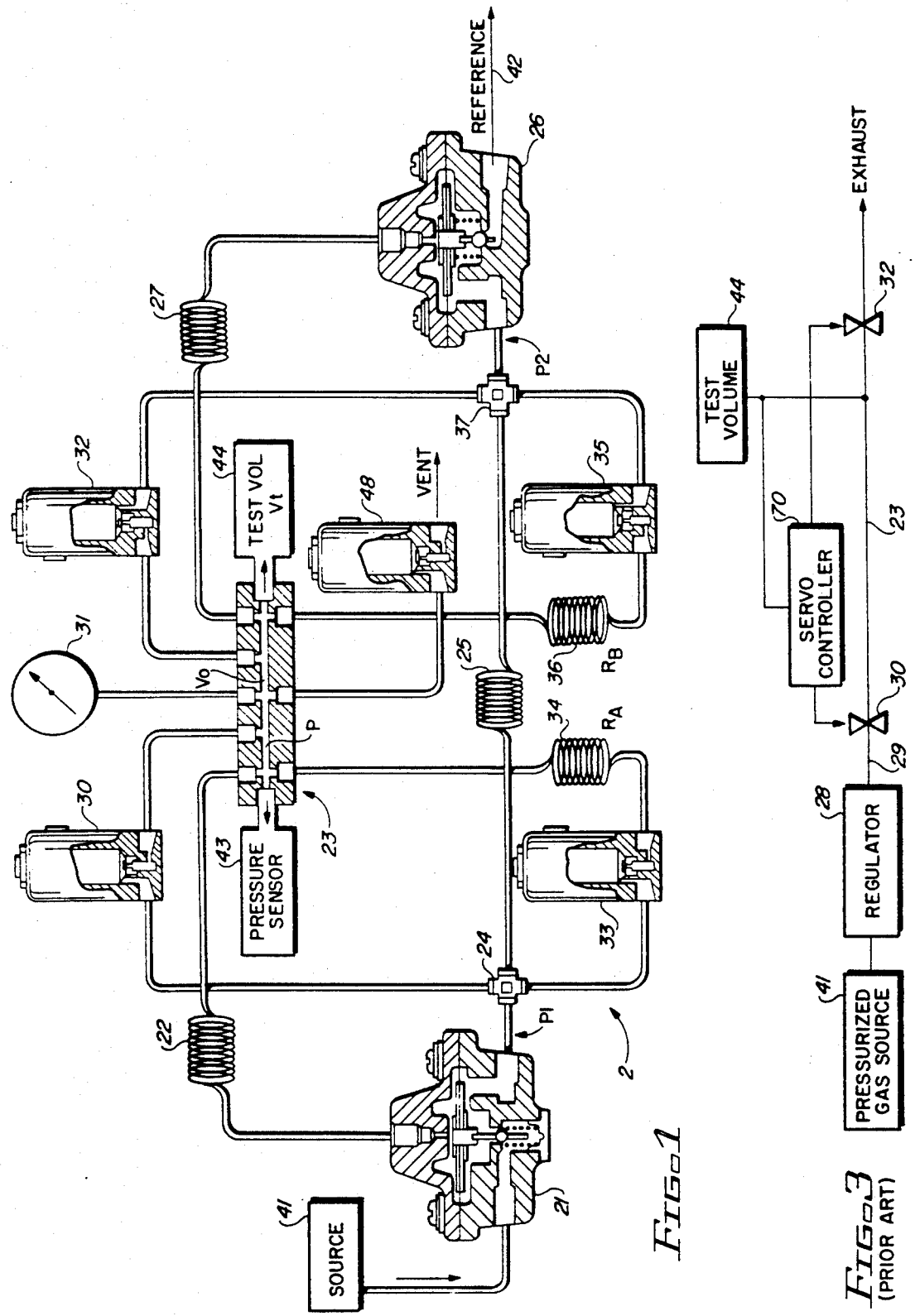

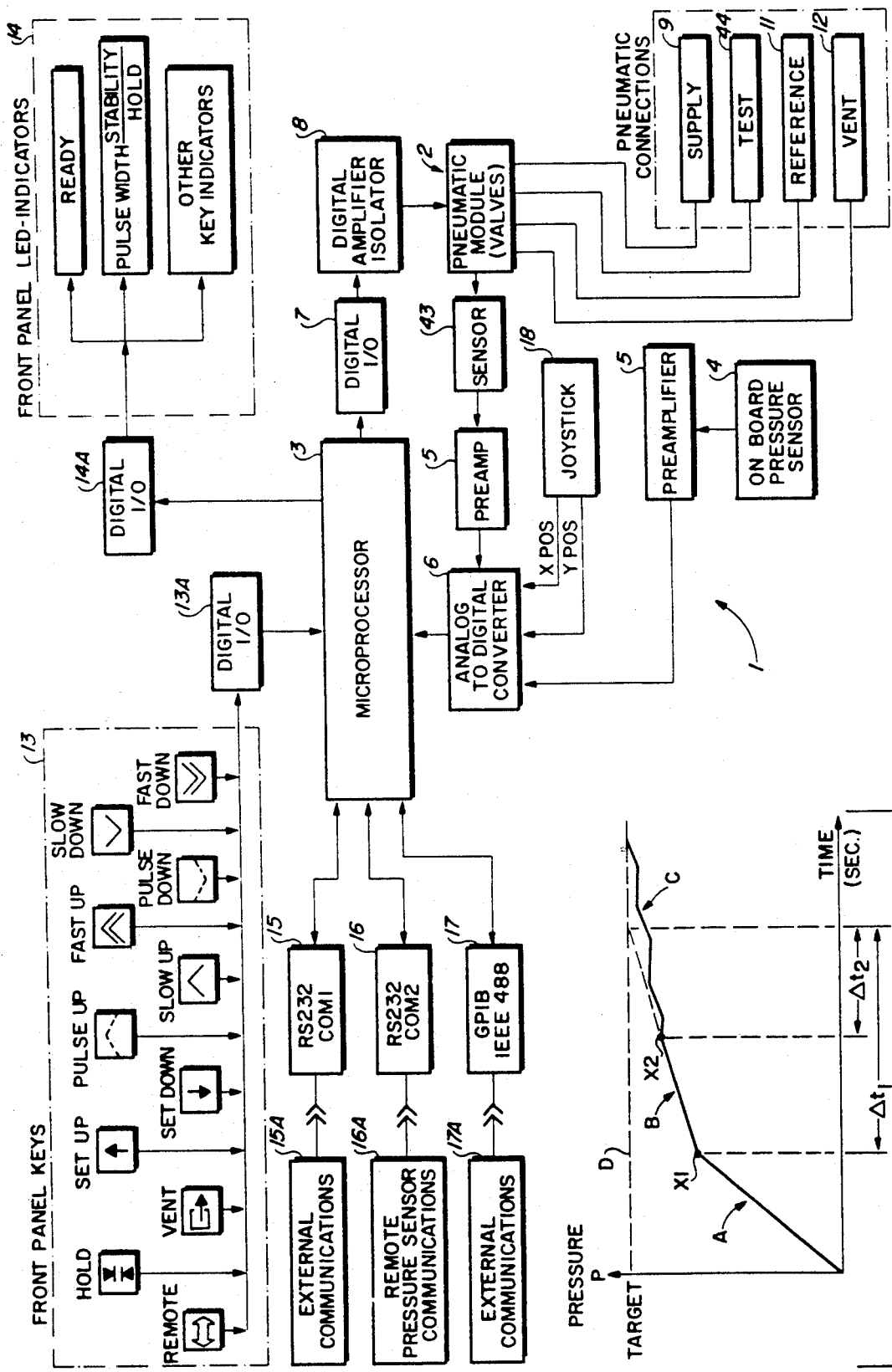

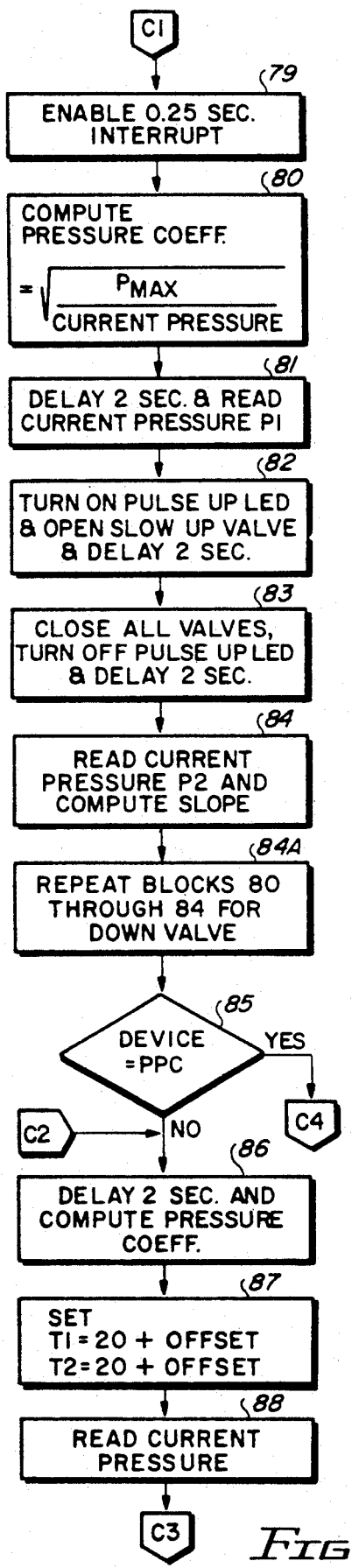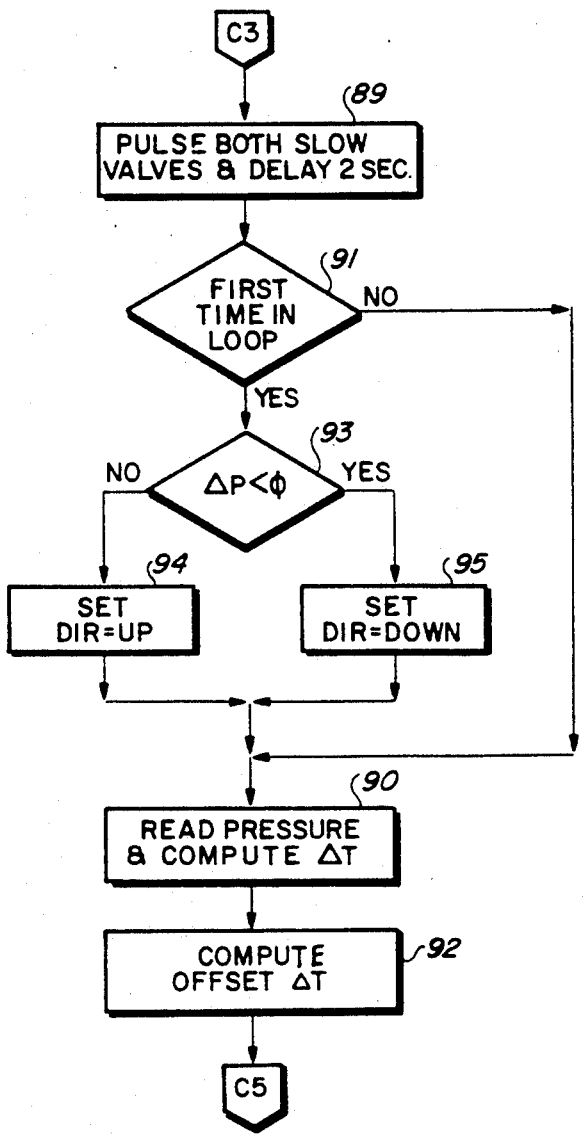
FIG. 5B
FIG. 5C

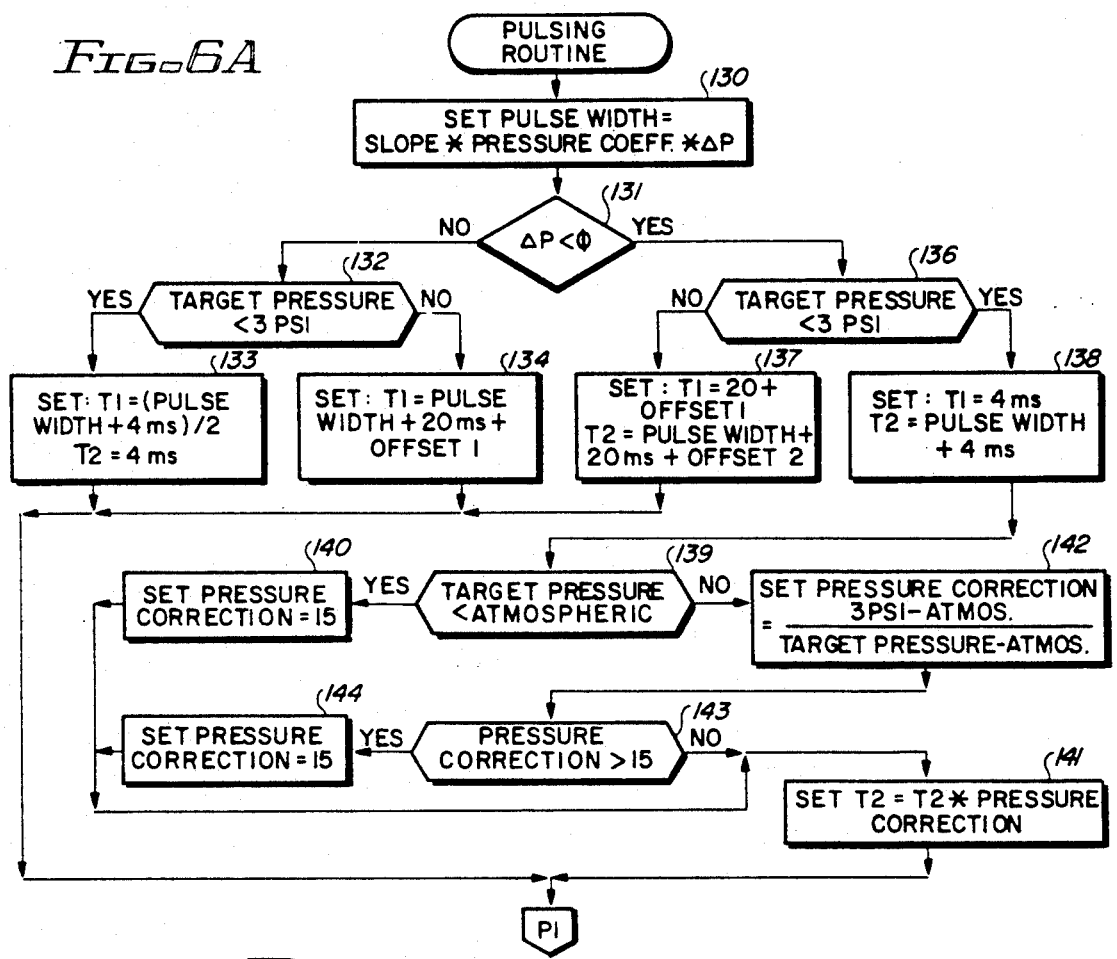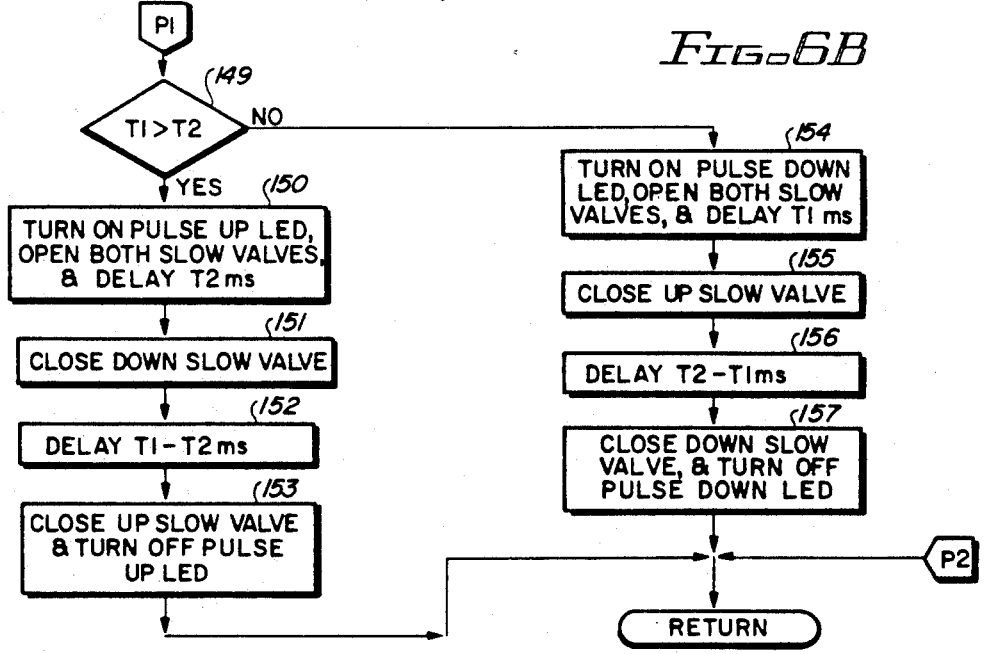

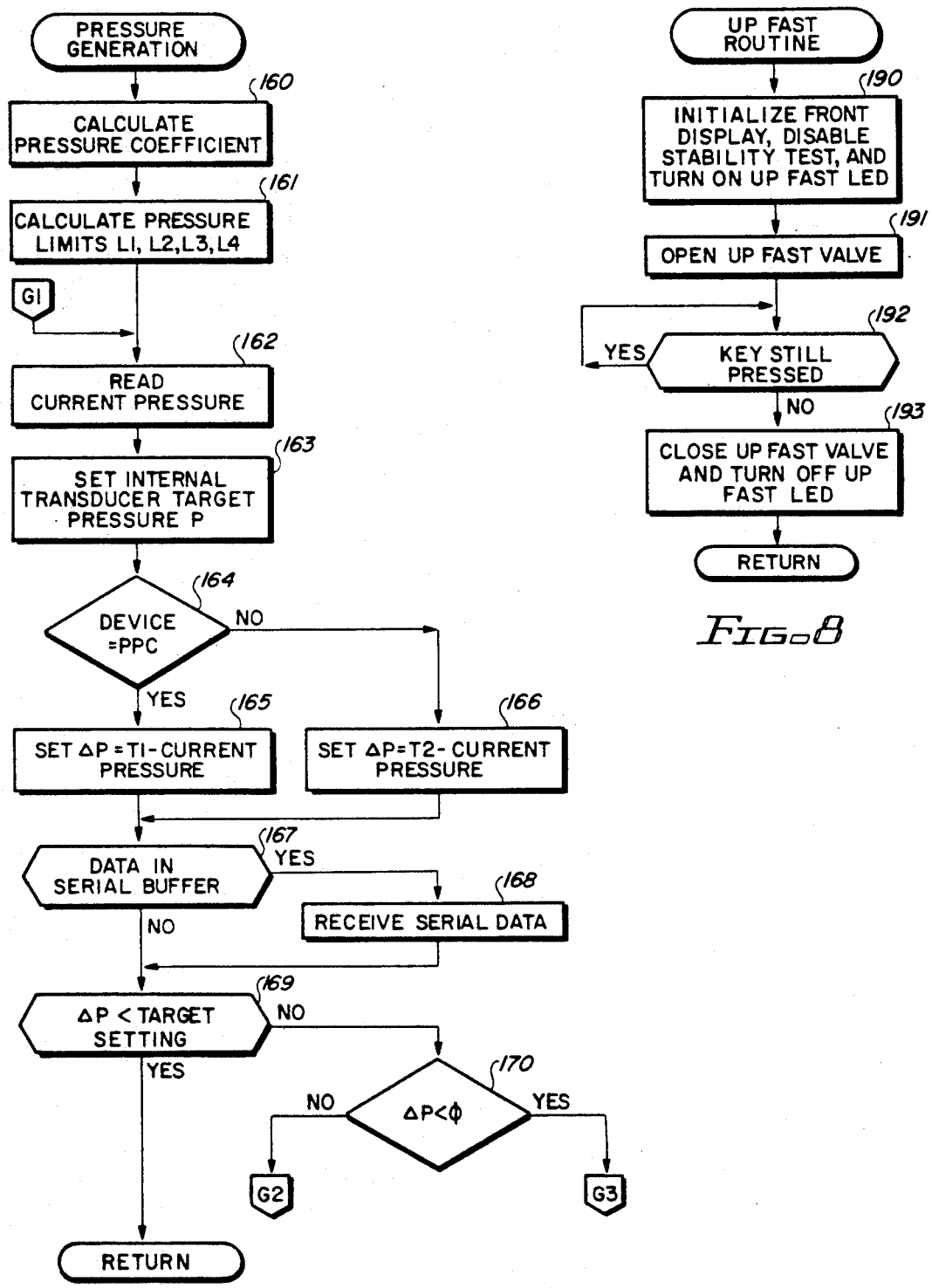

PRESSURE REGULATING SYSTEM FOR POSITIVE SHUT-OFF PRESSURE CONTROLLER

BACKGROUND OF THE INVENTION

The invention relates to methods and apparatus for rapidly, accurately setting and stabilizing gas pressure in a volume, and more particularly, to positive shut-off pressure controllers of improved accuracy, greater speed, and reduced size, complexity, and cost compared to prior art pressure controllers.

There exist a wide variety of pressure sensitive devices, such as transducers, transmitters, digital and analog gauges, pressure switches, pressure recorders, etc. having different "pneumatic" volumes associated therewith. There is a need to be able to rapidly and precisely test and calibrate such pressure sensitive devices. In order to do so, it is necessary to have a machine that can rapidly (i.e., within 10 to 15 seconds) generate selectable, precise test pressures without "overshooting".

For example, a prior art system shown in FIG. 3 shows a pressurized gas source (which can be a pressurized gas bottle), an inlet regulator 28 of conventional design supplying gas to an inlet 29 of a pressure controller which includes an inlet servo-valve 30 that feeds inlet gas into a manifold 23. Manifold 23 opens into a "test volume" 44, which includes the volume of a device being tested and calibrated. Manifold 23 also opens into an outlet servo-valve 32, which exhausts pressurized gas from manifold 23. The pressure in manifold 23 can be set by properly controlling the opening and closing of inlet valve 30 and exhaust valve 32. Generally, a minimum flow of the gas is constantly bled through regulator 28 and servo-valves 30 and 32. Pressure is controlled by operating the servo-valves to adjust flow through the volume into which pressure is being controlled.

Typically, a servomechanism 70 senses the pressure in manifold 23 and controls the action of servo-valves 30 and 32. This technique results in "dynamic" pressure control in which the pressure is constantly changing and being readjusted by action of a servo-valve. Furthermore, the accuracy and speed of operation are heavily dependent upon the magnitude of the test volume. If the test volume being "worked into" is substantially less than the maximum expected volume, the manifold volume $V_0$ will fill up much faster, and the resulting rapid changes in P are impossible to control precisely. Also, prior art controllers tend to consume large amounts of gas due to the flow through the test volume.

Prior pressure controllers of the type shown in FIG. 3 have an inherent shortcoming in that they "mask" the presence of leaks in manifold 23, test volume 44 or any interconnecting hardware between the two and the devices being tested or calibrated.

It should be appreciated that a fundamental assumption for any pressure controller used in the testing or calibration of pressure measuring devices is that the pressure is perfectly constant and stable throughout the volume to which a reference measuring device, and the devices being calibrated are connected so that the pressure indicated by the reference device and the pressure sensed by the device being calibrated are identical. The presence of a leak between the reference device and the device being calibrated causes a pressure drop and stable but unequal pressures within the volume. For a pressure controller of the type that maintains a constant flow of gas through the manifold that will compensate for a leak, there is no way of determining the presence of a leak while the system is operating. The only way that leaks can be detected in such prior pressure controller systems is by using external industrial leak detecting substances or by shutting off the controller and monitoring the pressure in the overall volume to detect the presence of a drop or increase in pressure, indicating the presence of a leak. Another shortcoming of this type of controller is that it continuously interferes with the pressure in the volume. It therefore cannot be used in conjunction with any other controlling device such as a dead weight tester.

Variable orifice pressure regulating systems are known, in which a servo controller produces analog signals that control the orifice size of both inlet and outlet valve orifices of variable orifice valves, referred to as servo-valves. Such systems require continuous gas flow, which is undesirable because pressure is maintained under the control of the servo controller system that continually adjusts the orifice sizes of the inlet and outlet servo-valves. This results in the measured test pressure varying or "oscillating" about an average pressure. This obviously prevents the user from achieving a perfectly stable test pressure because the test pressure is always under the influence of the servo controller which is continuously adjusting around the set value. Perhaps people skilled in the art would recognize that providing high speed digital, rather than analog, control signals to open and close a valve rather than an analog signal to vary the orifice size can produce average inlet and outlet gas flows that approximate the results achievable by analog variation of the orifice sizes. However, this approach requires very high speed, high power digital inlet and outlet valves and very high speed operation of such valves. This leads to high cost, high power consumption, and probably to valve reliability problems.

The prior art does not indicate how to implement a "positive shut-off" valve system, with reasonable reliability, that provides precise, stable test pressures, avoids servo controller caused oscillations of the test pressure about an average pressure, does not mask leaks in the test pressure system, and can precisely set a pressure value without significantly overshooting the value.

SUMMARY OF THE INVENTION

It is an object of the invention to provide a method and apparatus for rapidly and accurately setting and stabilizing pressure in closed volumes as is needed for testing and/or calibrating pressure sensitive devices, such as pressure transducers and the like.

It is another object of the invention to provide a system for rapidly setting and stabilizing gas pressure in a test volume relatively independently of the test volume size.

It is another object of the invention to provide a method and apparatus for setting and stabilizing pressure in a test volume in less than approximately 10-15 seconds with precision of better than ±0.01 percent of full scale value and overshoot less than +0.01 percent of full scale value.

It is another object of the invention to provide an automated technique and apparatus for effectively and accurately "floating" the piston of a dead weight tester.

It is another object of the invention to provide an improved technique for manually setting and stabilizing a precise pressure value as required, for example, to set an analog gauge on the cardinal pressure point when calibrating it.

It is another object of the invention to provide an improved technique and apparatus for calibrating pressure measuring devices that will not "mask" the presence of a leak associated with the test volume.

It is another object of the invention to provide a system for rapidly, accurately setting and stabilizing pressure in a test volume without consuming excessive quantities of gas.

It is another object of the invention to provide a system in which a test pressure can be controlled as grossly or precisely as desired in accordance with preselected speed and overshoot requirements.

It is another object of the invention to set and stabilize pressure in a test volume using apparatus of reduced size, weight, cost and power consumption compared to the prior art.

Briefly described, and in accordance with an embodiment of the invention, a pressure controller rapidly and precisely sets and stabilizes the pressure in a volume by opening a fast inlet solenoid valve or a fast outlet solenoid valve, and opening a slow inlet solenoid valve or a slow outlet solenoid valve to increase or decrease pressure in the manifold. When the pressure has reached a predetermined level relative to the desired set pressure, the fast inlet and fast outlet solenoid valves are closed, and only the slow inlet and slow outlet solenoid valves are opened to further increase or decrease the pressure to a second predetermined level. Based on the present pressure in the manifold, a computation is made of the amount of gas needed to be injected or removed from into the manifold to increase or decrease the pressure by the amount needed to reach the target pressure. A computation is made of the time duration during which the slow inlet valve and the slow outlet valve must be differentially opened to increase the net amount of gas injected into or removed from the manifold and test volume by the computed amount. Initially, a system configuration program is executed in which the first volume is computed and valve offsets are computed to compensate for differences in the turn on and turn off response times of the inlet and outlet solenoid valves. During a final "fine pressure control" pulsed mode of operation, the slow inlet solenoid and the slow outlet solenoid valve are differentially opened in accordance with such differences, using calculations based on volume, gas compressibility, valve offsets, and pressure rate of change of the valves. In the described embodiment of the invention, all of the solenoid valves are closed once the pressure in the manifold is within a preselected tolerance of a target pressure value. In the described embodiment, flow regulators are used to maintain a constant differential pressure across the solenoid valves. In the described embodiment, a feedback restrictor is provided between a port of the manifold and a diaphragm of an inlet regulator to delay feedback from the manifold so as to make flow through the solenoid valves relatively independent of changes in the test volume size.

BRIEF DESCRIPTION OF THE DRAWINGS

FIG. 1 is a schematic diagram of a pneumatic module of the present invention.

FIG. 2 is a block diagram of a positive shut-off pressure controller incorporating the pneumatic module of FIG. 1.

FIG. 3 is a pneumatic diagram useful in describing the prior art.

FIG. 4 is a graph useful in describing the operation of the system of FIG. 2.

FIGS. 5A-F constitute a flow chart of a system configuration routine executed by the microprocessor of FIG. 2.

FIGS. 6A and 6B constitute a flow chart of a fine pressure control pulsing routine executed in accordance with the present invention by the microprocessor of FIG. 2.

FIGS. 7A and 7B constitute a pressure setting and stabilizing routine executed by the processor of FIG. 3.

FIG. 8 is a flow chart of a subroutine for increasing pressure in response to a keyboard command from the pressure controller of FIG. 2.

DETAILED DESCRIPTION OF THE PREFERRED EMBODIMENTS

Figure 1A:
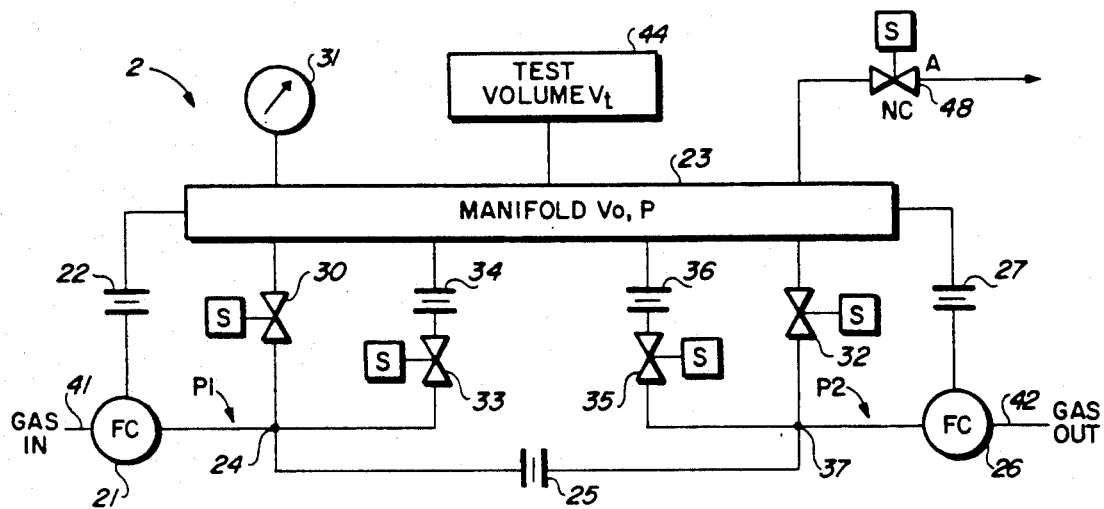
FIG. 1A is another schematic diagram of the pneumatic module of FIG. 1.

FIG. 1 shows a diagram of a "pneumatic module" 2 of the present invention. Pneumatic module 2 is incorporated in a pressure controller 1 shown in FIG. 2 and also is illustrated in Appendix 1, which is a brochure generally describing pressure controller 1.

Referring to FIG. 2, positive shut-off pressure controller (PPC) 1 includes a set of front panel keys 13. The keys includes a REMOTE key, which when depressed performs the function of putting the system into a REMOTE mode wherein it will accept and execute commands received over its interface and allow the access of other special functions from the front panel keys. The front panel also includes a HOLD key, which when depressed, performs the function of causing the controller to reset pressure to the target value whenever the pressure read by the system transducer 43 is more than a user settable limit away from the target value. Pressing the HOLD key for three seconds while in the REMOTE mode also initiates the configuration routine of FIGS. 5A-F. A VENT key, when depressed, vents a subsequently described manifold volume $V_0$. Pressing the VENT key for three seconds while in the REMOTE mode also initiates the automatic calibration of the internal transducer 43. SET UP and SET DOWN keys are provided which perform the function of setting the value of the pulse that results from pushing the PULSE key, setting the hold limits and setting the stability limits. A PULSE UP key when depressed causes the subsequently described fine pressure control pulsing routine to be executed resulting in a pulse or series of pulses of the magnitude set by the SET UP and SET DOWN keys. A SLOW UP key causes a subsequently described SLOW UP routine to be executed. A FAST UP key causes a subsequently described FAST UP program to be executed. A PULSE DOWN key when depressed causes a PULSE DOWN program to be executed. The SLOW DOWN and FAST DOWN keys cause the SLOW DOWN and FAST DOWN programs to be executed. A user can depress the various keys of front panel 13 to precisely set and hold pressure values using the pressure regulating system.

The positive shut-off pressure controller 1 also can be operated by sending instructions from a computer or controller over an electronic interface.

A microprocessor 3 receives information from keyboard 13 via a digital I/O module 13A, and generates control signals to solenoid valves 30, 32, 33, and 35 of pneumatic module 2 in FIG. 1. (FIG. 1A shows a schematic diagram of the pneumatic module 2 shown in FIG. 1, and may be helpful in interpreting the various connections in FIG. 1.)

Referring to FIG. 1 and/or FIG. 1A, a pressurized gas source 41 is connected to the inlet of an inlet regulator or flow controller 21, as indicated by numeral 41A. The outlet of inlet regulator 21 is connected by a "cross" coupler 24 (all 4 ports of which are in open communication with each other) to an inlet of a "fast" or coarse adjustment inlet solenoid valve 30. The outlet of inlet solenoid valve 30 which is connected to an inlet of manifold 23, which has a volume $V_0$. The outlet of inlet regulator 21 also is coupled by cross coupler 24 to the inlet of a flow restrictor 25, the outlet of which is coupled by another cross 37 to the inlet of an outlet flow controller or regulator 26. The outlet 42 of regulator 26 is coupled to a "reference" pressure. Inlet and outlet regulators 21 and 26 are commercially available constant differential flow controllers.

The reference pressure is either outside atmospheric pressure or a vacuum provided by a vacuum pump (not shown).

The outlet of inlet regulator 21 also is connected by cross 24 to the inlet of a "slow" or fine adjustment inlet solenoid valve 33, the outlet of which is connected to the inlet of a flow restrictor 34. The outlet of flow restrictor 34 is coupled into volume $V_0$ of manifold 23. Flow restrictor 34 and other flow restrictors subsequently described can be implemented by using preselected lengths of small diameter tubing.

Manifold 23 is coupled to a pressure sensor 43 that generates a signal representing present manifold pressure P, and also is coupled in fluid communication with a test volume $V_t$. Typically, test volume $V_t$ might be ten times the combined volume $V_o$ of manifold 23 and pressure sensor 43. Gauge 31 provides a visual indication of the present manifold pressure P and the rate of change of pressure in that manifold.

Manifold 23 opens into the inlet of a "fast" or coarse adjustment outlet solenoid valve 32, the outlet of which is connected to cross 37. Manifold 23 also opens into the inlet of a flow restrictor 36, the outlet of which is connected to the inlet of a "slow" fine adjustment solenoid valve 35. The outlet of slow solenoid valve 35 is connected to cross 37. Manifold 23 also opens into the inlet of a flow restrictors 27 and 22, the outlet of which are connected to the control inlet flow controllers 26 and 21. Finally, manifold 23 is connected to the inlet of a vent solenoid valve 48, the output of which vents the manifold.

The five above-mentioned solenoid valves all are electrically connected to digital amplifier isolator in 8 of FIG. 2 and are controlled by microprocessor 3. Microprocessor 3 also reads pressure P in manifold 23 by reading the signals produced by pressure sensor 43. The pressure at the outlet of inlet regulator 21 is designated $P_1$ and the pressure at the inlet of outlet regulator 26 is designated $P_2$.

The purpose of restrictor 25 (FIG. 1) is to minimize the constant flow through the inlet and outlet flow controllers 21 and 26. The flow controllers require constant flow to perform their function which is to maintain a constant differential pressure across valves 30, 33, 35, and 32, regardless of the values of P, $P_1$, and $P_2$. Note that the flow through the regulators is completely independent of the volumes $V_o$ and $V_t$. The constant differential pressure across the control solenoid valves helps eliminate one of the pressure control variables, which is changing differential pressure across the valve as pressures P, $P_1$, and $P_2$ change.

Flow restrictors 22 and 27 are used to slow down the establishment of counter-pressures on the diaphragms of inlet regulator 21 and outlet regulator 26, respectively, so that the rate of pressure increase or decrease of manifold pressure P as a result of operating a valve remains more or less constant regardless of variations of the test volume $V_t$. This is because the maintenance of $\Delta P$ across the valves is dependent only on the "resistance" of these flow restrictors and the volume associated with the control diaphragms.

"Slow" solenoid valves 33 and 35 differ from "fast" solenoid valves 30 and 32 in that the volume of gas flow through the "slow" pressure solenoid valves 33 and 35 is not limited by the valve seat orifice size, as is the case for fast valves 30 and 32, but by flow restrictors 34 and 36. This allows the gas flow through valves 33 and 35 to be limited so as to allow precise control of pressure P as a result of the flow through slow inlet and outlet valves 33 and 35 being nearly independent of the difference between manifold pressure P and the inlet and exhaust pressures $P_1$ and $P_2$ The volume of the connection between valve 33 and restrictor 34 should be minimized, as should the volume of the connection between valve 35 and restrictor 36.

The valve seat orifices of fast pressure control solenoid valves 30 and 32 and the values of feedback restrictors 22 and 27 are designed so a maximum expected total volume, including the manifold volume $V_o$ and the test volume $V_t$, will be filled with gas up to a selected maximum pressure P in a reasonably short time, e.g., 30 seconds.

In accordance with the present invention, precise setting of P without overshooting of P is rapidly achieved in manifold $V_o$ and in the test volume $V_t$ of the device 43 being calibrated or tested within a reasonably short time, e.g., ten seconds. "Fast" solenoid valve 30 and also "slow" solenoid valve 33 for increasing pressure (or valves 32 and 35 for decreasing pressure) initially all are opened to rapidly increase (or decrease) the pressure in volume $V_o$ to a level such that if only slow valves 33 and 35 are opened by microprocessor 3, eight more seconds theoretically would be required to bring the present pressure P in manifold volume $V_o$ to the selected "target pressure".

The mode of operation with both valves 30 and 33 opened corresponds to segment A of the pressure versus time graph of FIG. 4, in which segments A, B and C of the curve show the three modes of operation in the course of increasing pressure P in manifold 23 to a target pressure D. Point X1 in FIG. 4 is the point at which microprocessor 3 determines that if fast or coarse adjustment valve 30 is closed and only slow or "less coarse" adjustment valve 33 is left open, precisely $\Delta t_1$ more seconds would be required for P to reach the target pressure indicated by horizontal dotted line D. Point X2 is the point at which microprocessor 3 determines that if only slow valve 33 is left open, precisely $\Delta t_2$ more seconds would be required for P to reach the target pressure D. In the presently described embodiment of the invention, $\Delta t_1$ is eight seconds and $\Delta t_2$ is four seconds.

During segment B of the curve in FIG. 4, only slow valve 33 is opened. When the difference in pressure between target pressure D and manifold pressure P is computed to be at a value indicated by point X2 wherein P would reach the target pressure D in 4 more seconds with only slow valve 33 open, valve 33 is closed and a third mode of operation is used.

The third mode of operation, called "fine step pressure control", is performed under the control of microprocessor 3. During segment C of the curve in FIG. 4, the "fine step pressure control" mode of operation is performed wherein the durations of a sequence of control pulses are computed, and the control pulses are applied to slow valves 33 and 35 to differentially open them during the control pulses. The durations are calculated as a function of the difference between the actual manifold pressure P at the end of the last such pulse and the target pressure D. The calculation of such pulses also takes into account the influence of valve offset, slow speed rate of change, gas compressibility, the absolute value of the target pressure and the absolute value of the pressure in the test volume $V_t$ upon the rate of pressure variation of the manifold pressure P.

The above differential step pressure pulsing procedure typically is repeated three or four times, whereby very precisely controlled net amounts of gas are forced into and retained in volume $V_o$ through precisely computed control of slow inlet and exhaust valves 33 and 35. This pressure generation technique avoids "overshooting" of the target pressure D due to imperfections in the system, as the durations of pulses sent to the solenoid valves 33 and 35 are computed so that the net pulse size is roughly 50%-100% of the amount required to arrive at the target value D.

It should be understood that low cost solenoid valves ordinarily do not reliably respond to commands of less than 20 millisecond duration. The technique of "differential opening" of slow inlet and exhaust valves 33 and 35, now will be described. The technique of "differentially opening" the two valves involves opening both an inlet valve and an outlet valve simultaneously, and keeping them open for different lengths of time so the net result is equivalent to opening the inlet or exhaust solenoid for less than twenty milliseconds. Precise changes in manifold pressure P can be thereby achieved without using extremely sophisticated and expensive solenoid valves.

Differential opening of an inlet and exhaust valve pair requires determining the "offset" or difference between the turn on and turn off times of the two valves. The computed offsets then are used in operation of the inlet valve and outlet valve to achieve a very precise "differential" opening of both valves. To compute the offset between slow inlet valve 33 and slow exhaust valve 35, gas is introduced into manifold volume $V_o$ and test volume $V_t$. Then microprocessor 33 runs a subsequently described initialization routine in which the "offsets" or differences between the turn-on and turn-off times of each of a pair of valves are computed, stored, and later on included in the computations of durations during which valves 33 and 35 are open.

This allows the net or differential open time of each pair of inlet and exhaust valves to be controlled with resolution of less than 4 milliseconds, rather than 20 milliseconds, and consequently allows a precisely controlled net amount of gas to be added to or removed from volume $V_o$. This results in a precisely determined increase or decrease in pressure P.

A "system configuration" program executed by microprocessor 3 as can be described by referring to the flow chart of FIGS. 5A-5F. 5F. The system configuration routine computes (1) the slope (rate of change) of pressure when either of valves 33 or 35 is opened and (2) the opening coefficient of each valve, (3) rate of change of pressure per pulse when operating each valve alone, and (4) the offset of the valves 33 and 35. The offset is the difference in opening time commands of the two valves needed to cause the pressure change in the volumes of $V_t$ and $V_o$ to be zero when both valves are opened. In order to call the system configuration routine, P must be within 10%-60% of the full scale value. This is because the system attempts to correct pressure calculations and pressure gradients back to the "full scale" pressure. The system configuration program is called in response to depressing and holding the HOLD key of front panel 13 when in the REMOTE mode or by the command "CONFIG" over the interface. This program should be executed any time test volume $V_t$ is changed. The system configuration program also vents the system and determines if there is a vacuum pump attached to the reference port, i.e., the outlet of regulator 26. As indicated above, the rate of change of pressure for valves 33 and 35 are controlled by the lengths of the flow restrictors 34 and 36, respectively. Flow restrictors 34 and 36 are selected so that the rate of change of pressure resulting from flows through valves 33 and 35 are within about 5% of each other.

Figure 5A:
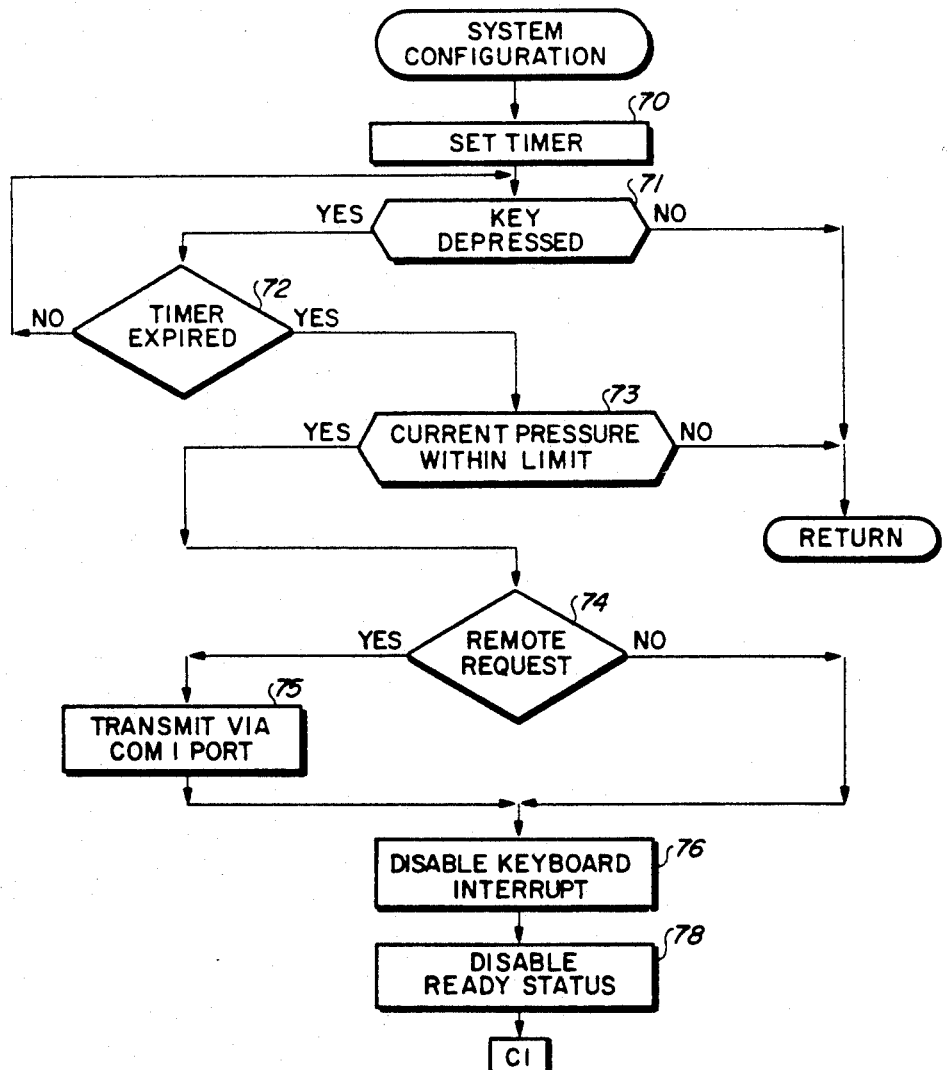
Figure 5D:
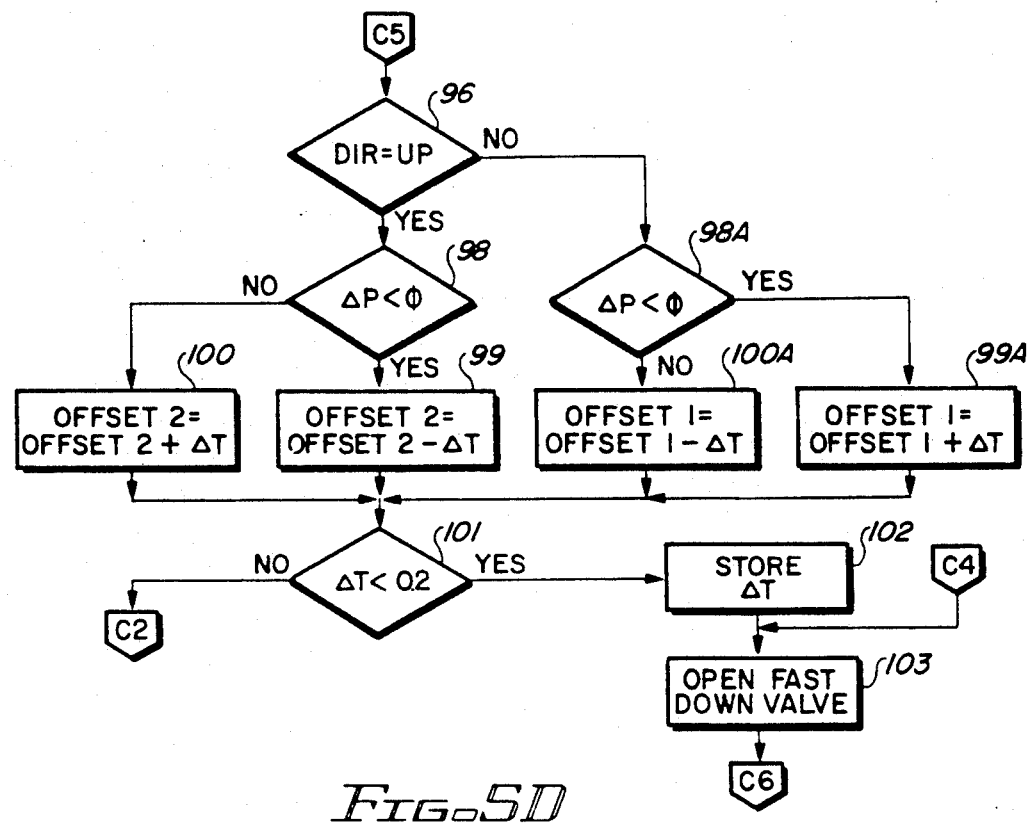
Figure 5E:
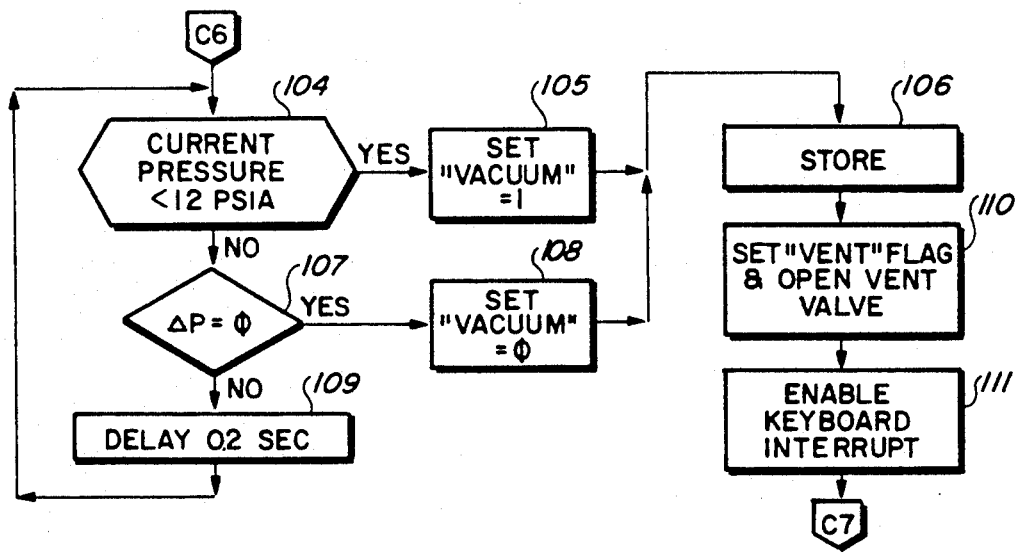

In block 70 of FIG. 5A, a 1.5 second software timer is set. To call the system configuration routine from the front panel keyboard 13 (FIG. 2), the HOLD key is depressed and held for 1.5 seconds. If pressure P is in the correct (10%-60% of full scale) range, a hold LED (light-emitting diode) will flash to indicate that the configuration routine is being executed. Decision block 71 determines if the HOLD key is still depressed, and if it has not, the program returns to the main idle loop of the operating software of microprocessor 3. If the HOLD key is still pressed, the routine goes to block 72 and determines if the HOLD key has been depressed for one and one-half seconds, and if not, the routine returns to the entry point of decision block 71.

If the HOLD key has been held depressed for one and one-half seconds, the program goes to decision block 73 and determines if pressure P is within the range of 10%-60% of the full scale value, and returns to the main idle loop if this determination is negative. If P is within the above range, the program goes to decision block 74 and determines if the present system configuration request is a "remote" request, (from a remote computer) rather than a "local" request, and if this is the case, goes to block 75 and transmits an acknowledge signal via the COM1 port of FIG. 2 to the requesting processor. In any case, the program then goes to block 76 and disables keyboard 13, the COM1 interrupts, and the ready and status flags. Then, only an abort command or interrupting the power by turning off the positive pressure controller 1 can interrupt execution of the system configuration program.

Next, the program goes to block 80 and computes a pressure coefficient that is used to compensate for the compressibility of gas in the system. The pressure coefficient is given by the equation $$\text{PRESSURE COEF.} = \sqrt{\frac{Pmax}{\text{TARGET PRESSURE}}} \quad (1)$$

where Pmax and TARGET PRESSURE are full scale values in absolute pressure units.

The pressure coefficient is used to correct pressure measurements and pressure gradients back to full scale values. This is done by simply multiplying the values of pressure P and certain computed derivatives thereof by PRESSURE COEF. to obtain the corresponding pressure or derivative at the full scale pressure. As indicated in block 81, PRESSURE COEF. is stored, and the program allows a 2 second delay for P to stabilize, and then operates microprocessor 3 to read a present first CURRENT PRESSURE P1 of internal pressure sensor 43 (or an external pressure reference if one is present).

In block 82, the program opens the slow inlet valve 33 and turns on a corresponding "pulse up" LED indicator, and then allows a 2 second pressure ramping delay to elapse before going to block 83 and closing all valves, turning off a "pulse up" LED, and allowing a 2 second pressure stabilization delay. The system configuration program then goes to block 84 and again reads a second CURRENT PRESSURE P2 reading produced by internal pressure sensor 43 (or an external pressure reference if one is present) and then computes the slope (i.e., derivative) of P from the two CURRENT PRESSURE readings immediately before and immediately after opening and closing of slow inlet valve 33. The slope is computed by dividing the difference between the two CURRENT PRESSURE readings by the duration during which valve 33 is open:

$$\text{SLOPE} = \frac{P2 - P1}{200 \text{ ms}} \text{ Pascals per millisecond.} \quad (2)$$

As indicated in block 84A, the entire procedure is repeated for exhaust valve 35 to obtain the slope or derivative of P associated with exhaust valve 35.

The system configuration program then goes to decision block 85 and determines whether the transducer being used to measure manifold pressure P is pressure sensor 43 (or an external pressure sensor that can be coupled to manifold 23 through an available port) read by microprocessor 3 via COM2 port 16 of FIG. 2. (This option is provided so a user can provide a more accurate pressure sensor than pressure sensor 43 supplied with the unit. The pressure sensor 43 is accurate to only 10 bits resolution which is not sufficiently accurate to make meaningful offset calculations to compensate for differences in response times of valves 33 and 35.)

An affirmative decision from block 85 bypasses the portion of the system configuration routine that computes such offsets. However, if an external pressure transducer is connected, it is assumed that it will have sufficiently high resolution to make computation of the offsets worthwhile. The system configuration program then goes to block 86, and after a 2 second delay for pressure stabilization, computes the pressure coefficient in accordance with equation (1) above. The program then goes to block 87 and sets in an initial value for T1, the computed open time for valve 33, as follows:

$$T1 = 20ms + OFFSET1 \quad (3)$$

The program also sets a current value of T2, the open time for exhaust valve 35, as follows:

$$T2 = 20ms + OFFSET2 \quad (4)$$

OFFSET1 and OFFSET2 are both equal to zero at this time. The program then goes to block 88, reads the value of P through COM2 PORT 16 and to read the value of P read from the external pressure transducer.

The system configuration program then goes to decision block 91, and if the present pass is the first pass through the loop being executed, the program goes to block 93 and determines if ΔP is less than 0, to determine if the direction DIR should be UP or DOWN, as indicated in blocks 94 and 95. This determines which valve must have the offset added to its open time. The program then goes to block 92 and calculates an initial value of offset ΔT in milliseconds, then goes to decision block 96 and determines if the variable DIR is equal to UP, and if this is the case, goes to decision block 98 and determines if the present measured value of ΔP is less than 0. If the DIR is not UP, the program goes to decision block 98A and determines if ΔP is less than 0. Once a direction is established it will not change, and any addition or subtraction from the offset will always be from the same valve offset.

Then, as indicated in block 89, both valves 33 and 35 are pulsed open one hundred times for the durations T1 and T2, respectively. After allowing a 2 second pressure stabilization delay, CURRENT PRESSURE P2 is read, as indicated in block 90 and a value of ΔP, the change in pressure per pulse, is computed by $$\Delta P = \frac{P2 - P1}{100}. \quad (5)$$

The offset ΔT, in milliseconds, is then calculated by:

$$\Delta P = \frac{\Delta P}{\text{SLOPE FOR OPPOSITE VALVE}}. \quad (6)$$

IF DIR equals up, then the offset ΔT will be added to the slow outlet solenoid valve 35. If DIR equals down, the offset ΔT will be added to the open duration for the slow inlet solenoid valve 33.

If the determination of decision block 98 is negative, the program goes to block 100 and sets:

$$OFFSET2 = OFFSET2 + \Delta T \quad (7)$$

and then goes to decision block 101. If the determination of block 98 is affirmative, the program goes to block 99 and sets:

$$OFFSET2 = OFFSET2 - \Delta T \quad (8)$$

In block 100A, OFFSET1 is set:

$$OFFSET1 = OFFSET1 - \Delta T \quad (9)$$

and in block 99A OFFSET1 is set:

$$OFFSET1 = OFFSET2 + \Delta T \quad (10)$$

In each case the program goes to decision block 101 and determines if ΔT is less than 0.2 milliseconds. If it is not, the program returns to the beginning of the loop at the entry point of block 86. If the new offset is less than 0.2 milliseconds, the program goes to block 102 and stores the new values of OFFSET1 and OFFSET2. If the pressure is increasing, as determined in decision block 96, then it is desirable to add the offset ΔT to the time T2 for valve 35, because it is desirable that neither valve be pulsed open for less than 20 milliseconds, so the offset should never be subtracted from either T1 or T2, but always added. (It should be understood that the response time for low cost solenoid valves is usually between 15 and 20 milliseconds, and that in the course of multiple passes through the loop, it may be that too much offset is added.) The loop is continued until the ΔT computed in block 92 is less than 0.2 milliseconds as determined in decision block 101.

If internal pressure sensor 43 is being utilized, so that the offset computation part of the system configuration routine is bypassed, the system configuration program enters block 103 from decision block 85. In any case, in block 103 microprocessor 3 causes the fast exhaust valve 32 to be opened for the purpose of determining if the outlet of regulator 26 opens into the ambient atmosphere or into a vacuum pump to establish absolute pressure. As indicated in block 104, the program determines if P is less than 12 psia, and if it is not, goes to decision block 107 and determines if ΔP is 0, and if this determination is negative, the program waits for 0.2 seconds as indicated in block 109 for pressure to stabilize, and re-enters the loop until an affirmative decision is obtained from either decision block 104 or 107. It is assumed that if the pressure ever drops below 12 psia, the user has connected a vacuum pump to the outlet of exhaust regulator 26 to effectuate measurement of pressure below atmospheric pressure.

If ΔP is equal to 0 in block 107, it is apparent that the pressure has stabilized at a pressure greater than 12 psia, so it is assumed that there is no vacuum pump attached, as indicated in block 108. This information is stored in block 106, and the program goes to block 110 to set a vent flag and open the vent valve to vent manifold 23 to the atmosphere.

The program then goes to block 111 and re-enables the keyboard interrupt, as indicated in block 111. As indicated in decision block 112 and blocks 113 and 114, the program sets the "local" flag, re-initializes the front display, turns off the "remote" mode, disables the 0.25 second interrupt, and turns off the "remote" LED or the "hold" LED as appropriate, and goes to decision block 115. The routine enters block 119, and reinitializes the stability checking routine, and returns to the main idle loop of microprocessor 3.

Referring next to FIGS. 6A and 6B, the pulse generation program controlling the "pulsing" of valves 33 and 35 is described. The pulsing subroutine is called by the pulse generation program of FIGS. 7A and 7B or by depressing the PULSE UP and PULSE DOWN keys of front panel 13. In block 130, the program computes the pulse width according to the formula $$PULSE\ WIDTH = SLOPE \cdot PRESSURE\ COEF. \cdot \Delta P \quad (11)$$

SLOPE is either the derivative of P caused by opening of inlet valve 33 or exhaust valve 35 previously determined by the system configuration program of FIGS. 5A-F. PULSE WIDTH is a duration during which an appropriate valve is held open by a pulse of that width. Since SLOPE is in Pascals per millisecond, PULSE WIDTH is computed in milliseconds.

If ΔP is less than 0, as determined in decision block 131, manifold pressure P is decreasing, and the subroutine goes to decision block 136. If target pressure D (see FIG. 4) is not less than 3 psi (which is a special case) the subroutine goes to block 137 and sets:

$$T1 = 20ms + OFFSET1 \quad (12)$$

and $$T2 = PULSE\ WIDTH + 20ms + OFFSET2 \quad (13)$$

The subroutine then goes to decision block 149 and determines if T1 is greater than T2. If this is the case, the program turns on a "pulse up" LED and opens both valves 33 and 35, and then allows T2 milliseconds, as indicated in block 150. It should be understood that the operation of decision block 149 is necessary because due to valve characteristics it is possible that if T1 is greater than T2, it might be necessary to have exhaust valve 35 on longer than inlet valve 33 even though an increase in P is desired. In block 151, exhaust valve 35 is closed and the delay T1−T2 is computed in block 152. Next, in block 153, the subroutine closes inlet valve 33 and turns off the "pulse up" LED on the front panel, and then returns to the main idle loop of the operating software of microprocessor 3.

If the determination of decision block 149 is negative, essentially the same procedure is followed in blocks 154, 155, 156, and 157, except that the initial delay is T1 milliseconds, valve 33 rather than 35 is closed, the computed delay is T2−T1 milliseconds, and the "pulse down" LED is turned off or on.

If the determination of decision block 136 of FIG. 6A is that the target pressure is less than 3 psi, then T1 is set to 4 milliseconds, rather than 20 milliseconds. The previously computed offsets are not valid for P less than 3 psi (for example), so they are not used. In block 138, T2 is set:

$$T2 = PULSE\ WIDTH + 4ms \quad (14)$$

Similarly, as indicated in block 133, if the target pressure D is less than 3 psi, the open time T1 for inlet valve 33 is set:

$$T1 = \frac{PULSE\ WIDTH + 4\ ms}{2} \quad (15)$$

and the open time T2 for exhaust valve 35 is set equal to four milliseconds. The pulsing subroutine goes from block 133 to decision block 149.

The pulsing subroutine goes from block 138 to decision block 139 to pulse pressure P downward from its present value, and determines if the target pressure is less than atmospheric pressure. It should be understood that flow controllers 21 and 26 ordinarily result in a 3 psi or less differential pressure across valves 33 and 35 unless P is less than the flow controller setting. In this event, a correction factor needs to be applied. If the target pressure is less than atmospheric pressure, the program goes to block 140 and sets a variable called PRESSURE CORRECTION equal to 15. If the target pressure is not less than atmospheric pressure, the program goes to block 142 and sets:

$$\frac{PRESSURE}{CORRECTION} = \frac{3\ psi - ATMOS.}{TARGET\ PRESSURE - ATMOS.} \quad (16)$$

Equation 13 is applicable for gauge pressure measurements. For absolute pressure measurements, the same equation can be used if ATMOS. is set equal to zero. The program then goes to decision block 143 and determines if PRESSURE CORRECTION is greater than 15, and if it is, then sets PRESSURE CORRECTION to 15. In any case, the program then goes to block 141 and computes:

$$T2 = T2 \cdot PRESSURE\ CORRECTION \quad (17)$$

The pulsing subroutine then goes to decision block 149.

Figure 7B:
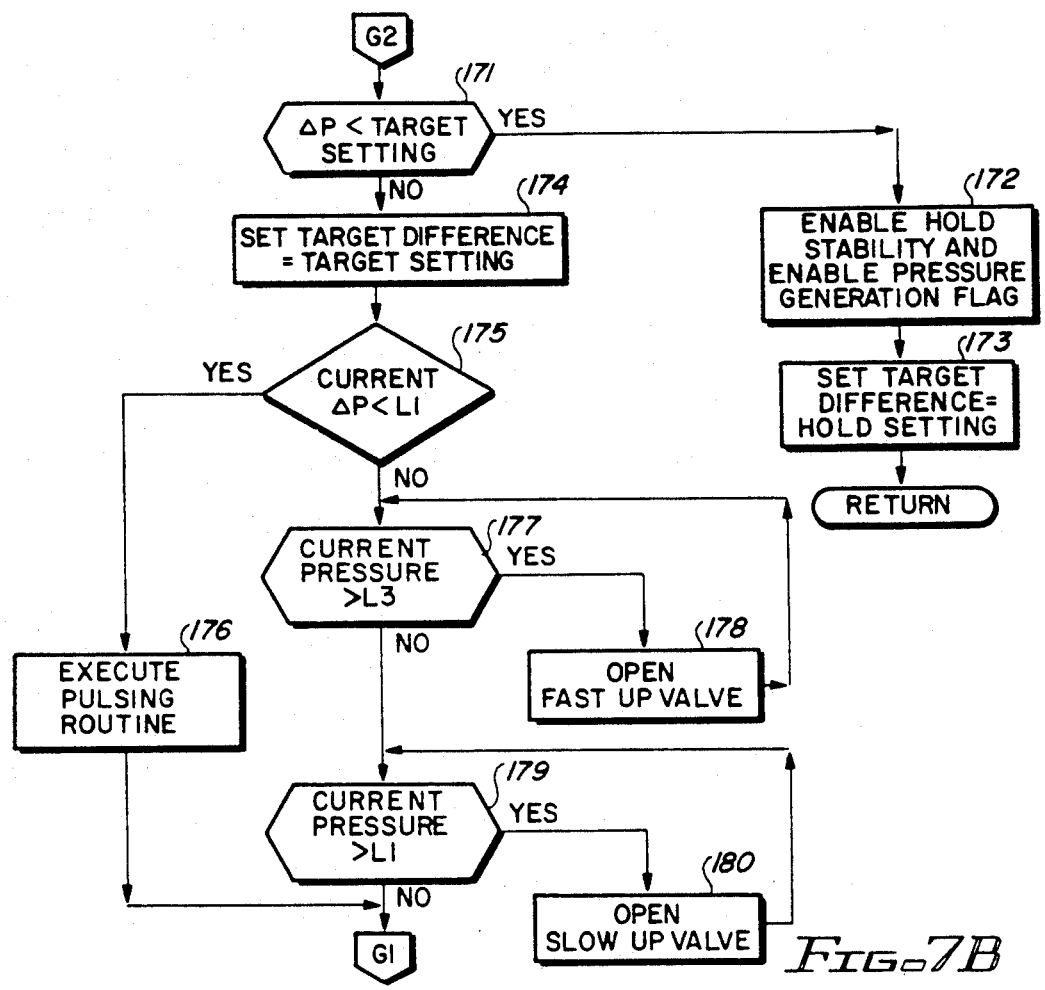

Referring next to FIGS. 7A and 7B, the pressure generation program that calls the pulsing routine of FIGS. 6A and 6B, begins in block 160 by calculating the pressure coefficient using formula (1). In block 161, the pressure generation program computes four pressure limits corresponding to points such as X1 and X2 in FIG. 4. For increasing pressure P, L1 is a pressure limit at point X2 and L2 is the pressure limit at point X1. For decreasing pressure, L3 corresponds to point X2 in FIG. 4, and L4 corresponds to point X1 in FIG. 4. The values L1-L4 are the pressures to be utilized in the pressure generation process. In each case, the pressures correspond to how long it will take to get to the target pressure using the "slow valve" slopes of valves 33 and 35.

In block 162, the program reads CURRENT PRESSURE (the current value of P) from pressure sensor 43 (or a more accurate external pressure reference if there is one) and then goes to block 163 and calculates the target pressure using the internal pressure sensor 43. The reading from internal pressure transducer 43 is used because it can be accessed in only about 100 milliseconds, compared to longer unknown times for an external device.

In decision block 164, the pressure generation program determines if internal transducer 43, rather than an external pressure transducer, is to be utilized for measurements in the pressure generation program. If not, the program goes to block 166 and sets:

$$\Delta P = T2 - CURRENT\ PRESSURE. \quad (18)$$

but otherwise goes to block 165 and sets:

$$\Delta P = T1 - CURRENT\ PRESSURE. \quad (19)$$

The routine goes to decision block 167 and determines if there is data present in the serial buffer, and if so receives it and executes whatever command is appropriate, and in any case goes to block 169 and determines if $\Delta P$ is within a "target setting range" of the target pressure.

If the determination of block 169 is affirmative, the program returns to the main idle loop of microprocessor 3, but otherwise goes to block 170.

The target setting range might be 0.001 psi. What this means is that whenever a pressure correction is being made, the pressure is brought back to within 0.001 psi of the target pressure. The program stays within that range and does not make another pressure correction until the P moves outside of a "hold setting", which is always greater than or equal to the target setting range.

If the value of $\Delta P$ computed in block 165 or 166 is not less than 0, the program goes to decision block 171 of FIG. 7B and determines if $\Delta P$ is less than the target setting. If so, the program goes to block 172 and experiences a "hold stability subroutine" and sets a pressure generation flag, and in block 173 sets "TARGET DIFFERENCE" equal to the "hold setting". The program then returns to the main microprocessor idle loop.

If a negative determination is made in decision block 171, the program goes to block 174 and sets TARGET DIFFERENCE equal to the target setting, and then goes to decision block 175. If the present value of $\Delta P$ is less than L1, the program calls the pulsing subroutine of FIGS. 6A and 6B, as indicated in block 176, and then loops back to the entry point of block 162. Otherwise, the program goes to decision block 177 and determines if the CURRENT PRESSURE difference is greater than L3, and if this is the case, the program goes to block 178, opens "fast" inlet valve 30, and then returns to the entry point of decision block 177. If the determination in decision block 177 is negative, the program goes to decision block 179 and determines if CURRENT PRESSURE is greater than L1. If this determination is affirmative, the program opens up slow inlet valve 33 and returns to the entry point of decision block 179. Otherwise, the program returns to decision block 162.

If the determination of decision block 170 is affirmative, the program goes to a routine essentially similar to that of FIG. 7B, except that the fast outlet valve 32 and the slow outlet valve 35 are opened instead of the corresponding inlet valves.

Referring to FIG. 8, it discloses a flow chart of the subroutine executed by microprocessor 3 in response to depressing of the "FAST UP" key of keyboard 13 to manually cause pressure P in manifold 23 to be increased. The first step in the subroutine is to initialize the front display, by turning on the "fast up" LED as indicated in block 190. The subsequently described stability determining routine is "disabled", and the fast up LED is turned on in block 190. Then the program goes to block 191 and opens fast inlet solenoid valve 30, goes to decision block 192 and determines if the FAST UP key is still depressed, and loops back on itself and holds valve 30 open until the FAST UP key is no longer depressed. The program then goes to block 193 and closes valve 30 and turns off the "fast up" LED. The flow chart of FIG. 8 is similar to an essentially identical subroutine (not shown) which is executed when the SLOW DOWN key of the keyboard 13 is depressed.

Figure 9:
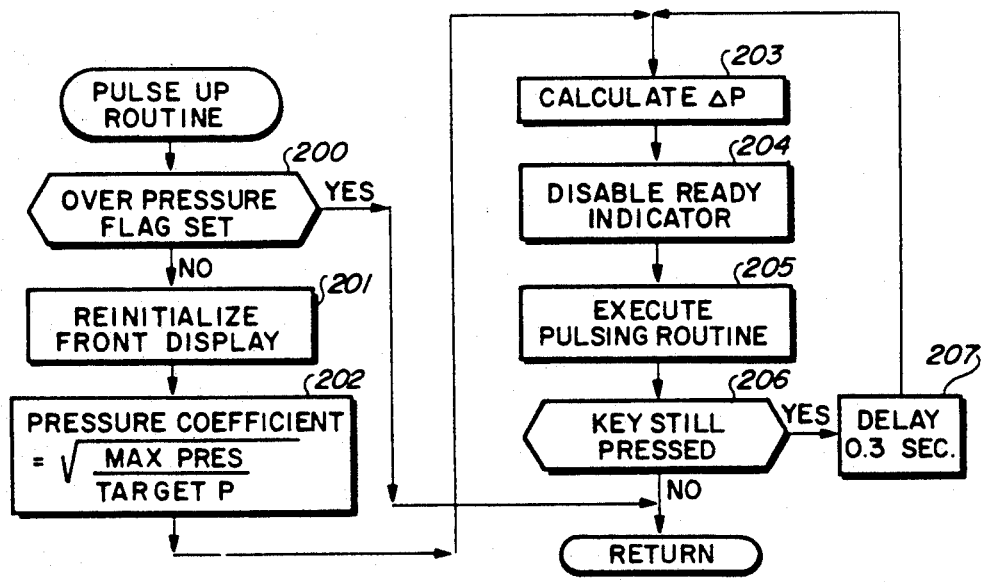
FIG. 9 is a routine for actuating the pulsing routine of FIGS. 6A and 6B in response to a keyboard command.
Figure 5F:
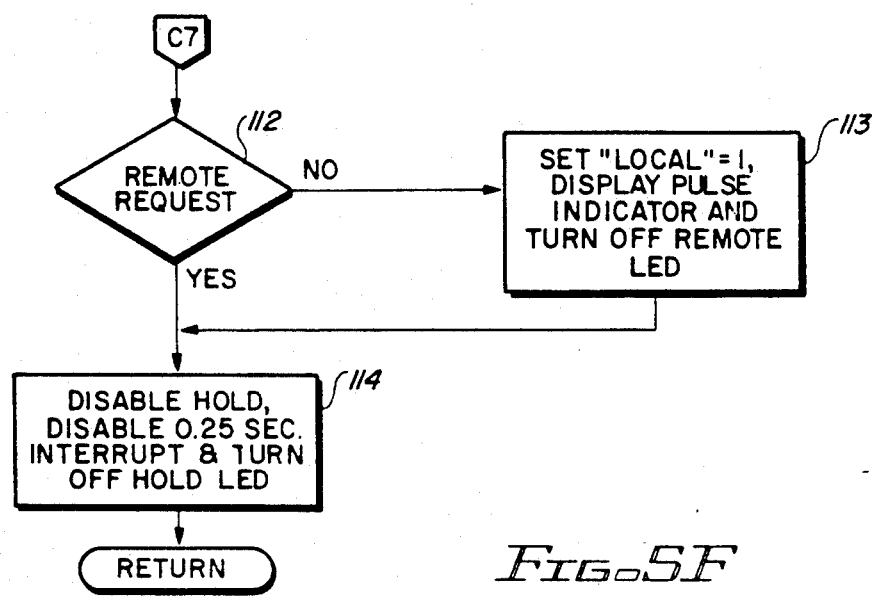

FIG. 9 shows a flow chart of a subroutine executed by microprocessor 3 when the PULSE UP button of keyboard 13 is depressed. This routine first goes to block 200 and determines if an "over-pressure" flag is set, and if it is, returns to the main idle loop, so as not to further over-pressure the system. Otherwise, the program goes to block 201 and re-initializes the front display panel, and then goes to block 201 and computes PRESSURE COEFFICIENT, using formula (1). The program then goes to block 203 and calculates $\Delta P$. (The target is actually the current pressure because the program is pulsing from the present pressure.)

The program then goes to block 204 and disables the "ready" indicator, and then goes to block 205 and calls the pulsing subroutine of FIGS. 6A and 6B. The program then goes to decision block 206 and determines if the PULSE UP key is still depressed, and if it is, waits 0.3 seconds as indicated in block 207 and then returns to the entry point of block 203 and makes another pass through the loop. When the PULSE UP key is no longer depressed, the program returns to the main idle loop. An entirely similar subroutine (not shown) is called and executed by microprocessor 3 when the "PULSE DOWN" button of keyboard 13 is depressed.

Figure 10:
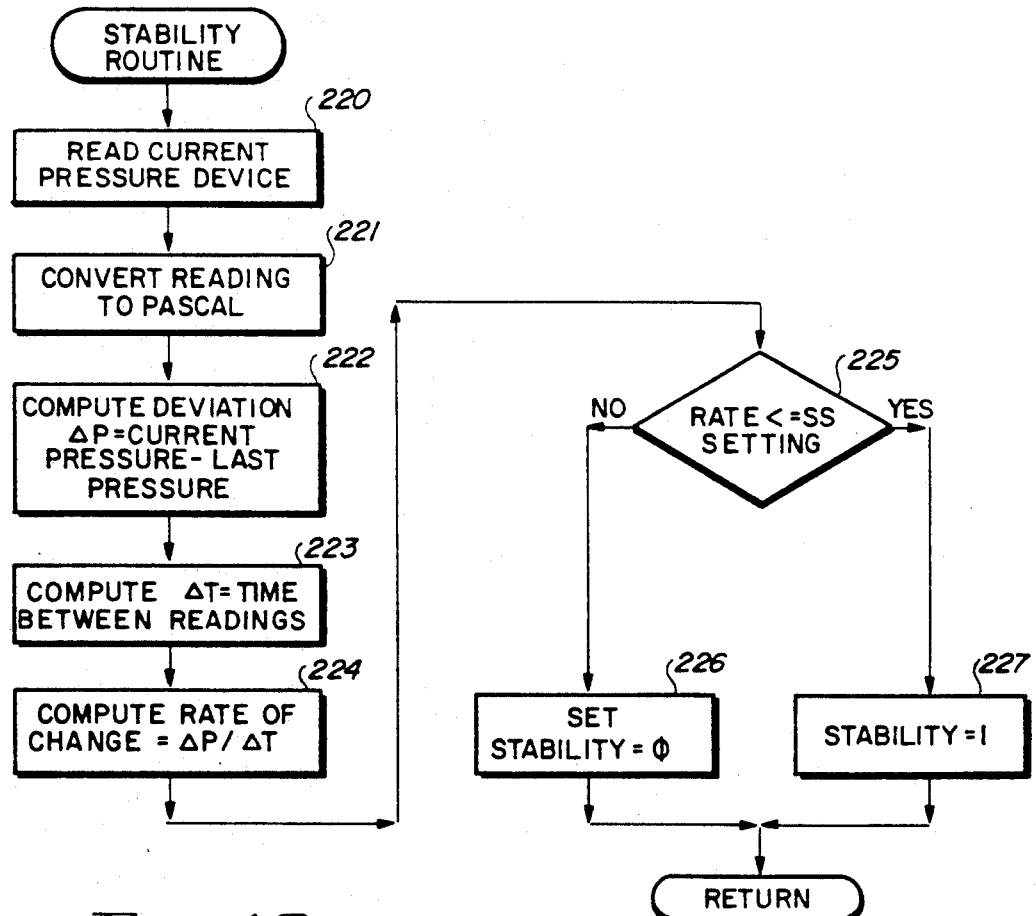
FIG. 10 is a flow chart of a routine executed by the processor of FIG. 2 for determining stability of pressure in the volume in which pressures are being controlled.

FIG. 10 is a flow chart of the stability subroutine executed by the microprocessor 3 in order to indicate if the pressure P has stabilized so that the system is ready to calibrate the next point of the pressure transducer. Whenever the program is either executing the pressure generation program of FIGS. 7A and 7B or is operating in the main idle loop, it continually reads the pressure P from either pressure sensor 43 or an external pressure transducer connected to volume P0. Therefore, the consecutive pressure readings are continually available and the amount of time elapsed between consecutive readings is available, so a slope of the pressure P is always available. In FIG. 10, blocks 220-223 indicate these steps. In block 224 the rate of change of P is computed, and in decision block 225 the rate of change is compared to the SS stability setting that has been selected. The SS setting can be established by the user from the front panel or from a remote computer. If it is less than or equal to the current stability setting, it indicates that the pressure P is stable, and a variable STABILITY is set to "1" as indicated in block 227. Otherwise STABILITY is set equal to "0", and the stability subroutine returns to the main idle loop. If the variable stability is not set to a 1, it may automatically indicate the presence of a leak, depending on the value of the stability setting SS. It should be appreciated that although not shown in FIG. 10, microprocessor 3 always sets the variable READY to a zero if any of the valves is open or if the pressure P most recently measured is not within the "HOLD" range if HOLD is on. If those two tests are met, then the routine of FIG. 10 sets READY to a "0" or "1" in accordance with whether the rate computed in block 224 is less than or exceeds the user-established STABILITY setting.

Next, a description of typical manual operation of the PPC controller 1 will be explained. Typically, PPC controller 1 is utilized to set and stabilize a sequence of pressure values required for the calibration of a pressure-sensitive device relative to a reference. This example illustrates calibration of an analog pressure gauge with a range of 0-100 psig and an accuracy of ±0.5% of full scale. The reference device is assumed to be a digital pressure gauge with a range of 0-100 psig and an accuracy of ±0.05% of full scale value. The desired calibration sequence assumes ascending and descending increments of pressure equal to 20% of full scale value, starting and ending at 0 psig, vented to atmospheric pressure. The steps are as follows:

(1) The device under test and a reference pressure monitor (RPM) are connected to the test port of the PPC controller 1, using leakfree interconnecting pneumatic hardware. The RPM includes an accurate pressure sensor which can be read by microprocessor 3. A pneumatic pressure supply 41 of 100-150 psi is connected to inlet flow controller 21.

(2) The CONFIGURATION routine of FIGS. 5A-F is executed. The pressure is set by depressing the FAST UP key on panel 13, visually reading gauge 21 until a reading of approximately 50 psig is attained. The REMOTE key is depressed to put the controller 1 in the "remote mode". The HOLD key is depress ed until the hold indicator light begins flashing to indicate that the CONFIGURATION routine has been begun. At the end of the CONFIGURATION routine, microprocessor 3 causes the vent valve 48 to be opened, venting the system to atmospheric pressure.

(3) The "hold" limit is established by using the SET UP key to set the hold limit at ±0.1% of full scale value, which is five times better than the accuracy of the device under test being calibrated. (If the system is not already in the "remote mode", the REMOTE key is depressed, because in "remote mode", the settings indicator shows the settings of the hold limit and the stability limit.)

(4) The "stability limit" is set by depressing the SET DOWN key to set the stability limit at 0.02% full scale per second. (If the system is not in the "remote mode", the REMOTE key is depressed to place this system in the remote mode so that the settings indicator shows the settings of the hold limit and the stability limit.)

(5) The pressure step value is set by using the SET UP and/or SET DOWN keys to set the step value at 0.05% full scale, which is ten times better than the accuracy of the device under test being calibrated. The system should not be in the remote mode, so that the settings indicator shows the setting of the step value rather than showing the hold limit and stability limit.

(6) The system then is vented to set the zero psig point by depressing the VENT key. The vent indicator light goes on. The operator waits until the "ready" indicator light goes on to indicate that the pressure has met the "ready" tests, indicating that no valves except vent valve 48 are operating, that the pressure is within the hold limit, and that the user set stability criteria has been met. The operator records the reading of the analog gauge under test.

(7) The FAST UP and the SLOW UP keys and the STEP UP key are used to set the pressure as read by the reference digital pressure gauge to 20 psi to within 0.1 psi. Once this value has been reached, the HOLD key is depressed to maintain that value. The operator waits for the ready indicator light to turn on, and records the present reading on the analog gauge under test.

Next, the operator repeats steps (1)-(7) for each of the 40, 60, 80, 100, 80, 60, 40, and 20 psi increments in that order, and for the last point, namely 0 psig, presses the VENT key, waits for the ready indicator light to go on, and records the reading of the analog gauge under test.

Next, an automatic computer-controlled operation will be described. When a large volume of pressure calibrations are to be performed and/or the pressure calibration work is very intensive, such as when many pressure increments need to be set or the calibration has to be run at a number of different temperatures, it is useful to automate the complete calibration process by having it controlled by microprocessor 3. In this case, the controller system 1 acts as a pressure setting peripheral of a computer. The computer will have other peripherals, such as a data acquisition system and an environmental chamber, typically. In the present example, it will be assumed that the object is to calibrate a pressure transducer with a range of 0-100 psig and an accuracy of ±0.1% of full scale value. The reference device is a high accuracy digital pressure gauge with a range of 0-100 psig and an accuracy of ±0.01% of full scale value. The calibration sequence is to be in increments of 20% of full scale value, ascending from 0 psig to full scale value and descending back to 0 psig. The steps include the following:

(1) The devices under test and the reference device are connected to the test port of the controller 1 using leakfree interconnecting pneumatic hardware. It is assumed that a suitable pneumatic pressure supply is already connected.

(2) A digital pressure gauge RS232 interface circuit is connected to the COM2 port 16 of the controller system shown in FIG. 2.

(3) The COM1 port 15 is connected to the external computer for RS232 communications.

The following commands are executed automatically in response to commands from the external computer.

(4) The controller system 1 is initialized by automatically configuring the controller 1 to work with the external digital pressure gauge using the UDD=- command and then the device=UDD command, which describes the digital pressure gauge connected to COM2 and instructs the positive pressure shut-off controller 1 to use the digital pressure gauge to measure pressure. (The UDD (User Defined Device) command is utilized to define the parameters of a "User Defined Device".) The controller 1 is then set to operate in the appropriate pressure units by sending a UNIT=PSI command to the controller 1. The "hold limit" is set at ±0.01 psi value using the command HS=0.01. (The HS (Hold Setting) command allows the user to set the above-described hold range.) This command sets the hold limit in the same way that the hold limit was set from the front panel. Next, the "target limit" is set at ±0.005 psi using the TS=0.005 command. (The TS (Target Setting) command allows the user to set the target pressure limit, i.e., how close the pressure must be to the target value before it is considered to have been set to the target value.) The stability limit is set at 0.005 psi per second.

(5) The CONFIGURATION routine as described above is executed, setting the pressure at 50 psi, initiating execution of the configuration routine, and waiting until it has been executed.

(6) 0 psig is set as the first increment of the desired automatic calibration sequence, by using the "VENT=1" command to open valve 48 and vent the system to atmospheric pressure. The stabilization routine is executed and when a ready indication is received indicating that the system has been vented and the pressure stabilizes 0 psig, the value of the present reading of the transducer under test is read.

(7) The next increment, 20 psig, is set, using the PSH=20 command. The computer waits for a ready indication that no valves are open, the pressure is within the present hold limits, and the user-established stability criterion has been met. Once a ready indication is received, the transducer under test is read.

(8) Step 7 is repeated for further pressures of 40, 60, 80, 100, 80, 60, 40, and 20 psig in that order.

(9) Step 6 is repeated for 0 psig.

The above-described embodiment of the invention distinguishes over prior pressure control systems by providing a combination of a coarsely controlled generation of pressure buildup in a test volume, followed by slow, precisely controlled stepped operation of the slow solenoid valves 33 and 35 using computed durations of valve open times to cause the test pressure to reach the target pressure without pressure overshooting. The above embodiment further distinguishes over the prior art by the utilization of flow restrictors such as 22 and 27 in conjunction with inlet flow controller 21 and outlet flow controller 26 to maintain fairly constant differences in pressure across the inlet solenoid valves 30 and 33 and the exhaust solenoid valves 32 and 35.

The above-described invention, by providing positive pressure shut-off operation, allows the pressure P in manifold 23 to become very stable, because when all of the valves are closed, the microprocessor 3 is not taking any action that can result in pressure changes in the system. The user can then interpret pressure readings as being the exact value of stabilized pressure in the system, rather than having to make the assumption that there are no significant pressure differentials in the system due to the leaks and/or controller interference with the set pressure.

The above-described embodiment of the invention further distinguishes over the prior art by the operation of microprocessor 3 to measure the pressure P at the beginning of the test pressure generation procedure to compute the "differential" amounts of time the inlet and exhaust solenoid valves are to be open so as to obtain a certain change of pressure P.

The invention further distinguishes over the prior art by providing an automated initialization technique, under control of microprocessor 23, in which the magnitude of the test volume $V_t$, the pressure rate of change of the slow valves and the solenoid valve differential "offsets" are computed, stored, and later used in the above-described step pulsing technique which is the final phase of the three phase technique for precisely building up the pressure P to the target pressure. The invention further allows the same performance to be achieved with different test volumes without iterative manual adjustments.

The invention further provides a technique of using feedback restrictors such as $R_i$ to delay feedback to the control diaphragm of the inlet and exhaust flow controllers, to adjust inlet and exhaust gas flow in response to large changes in the total pressurized volume including the manifold volume and the volume of the transducer being tested.

The described system avoids the need to use the servo control techniques of the prior art, and avoids many of the disadvantages thereof. For example, the achievable stability of manifold pressure is not influenced by the performance of a servo control system. More specifically, the positive shut-off technique eliminates the constant readjustment that is characteristic of servo control techniques.

Appendix 2 (not printed, but, found in jacket of case) is a hexadecimal printout of object codes for the routines written in the language C and assembly language of FIGS. 5A-F, 6A-B, 7A-B, 8, 9, and 10.

All the values and equations indicated above are to allow a better understanding of the system. These values can be adjusted as a function of the particular hardware used and the level of performance and sophistication desired.

While the invention has been described with reference to several particular embodiments thereof, those skilled in the art will be able to make the various modifications to the described embodiments of the invention without departing from the true spirit and scope of the invention. It is intended that all elements and steps which perform substantially the same function in substantially the same way to achieve the same result are within the scope of the invention.

What is claimed is:

1. A method of rapidly, precisely setting and stabilizing the pressure in a test volume, the method comprising the steps of:
   (a) opening a fast inlet solenoid valve and a slow inlet solenoid valve, the fast inlet solenoid valve and the slow inlet solenoid valve coupling a pressurized gas source into a manifold, thereby increasing pressure in the manifold, a slow outlet solenoid valve coupling the manifold to a reference pressure source;
   (b) determining when the pressure in the manifold has reached a first pressure such that if the slow inlet solenoid valve is opened for a first preselected time while the fast inlet solenoid valve is closed, pressure in the manifold will be equal to a target pressure;
   (c) after the pressure in the manifold has reached the first pressure, closing the fast inlet solenoid valve, resulting in further increasing the pressure in the manifold more slowly than in step (a);
   (d) determining when the pressure in the manifold has reached a second pressure such that if the slow inlet solenoid valve is opened for a second preselected time during which the fast inlet solenoid valve is closed, the manifold pressure will be equal to the target pressure; and
   (e) after the pressure in the manifold has reached the second pressure, computing an amount of gas needed to be injected into the manifold to increase the pressure in the manifold by a certain amount, based on the present pressure in the manifold and the test volume, and computing a time duration during which the slow inlet solenoid valve and the slow outlet solenoid valve must be differentially opened while the fast inlet solenoid valve is closed to increase a net amount of gas injected into the manifold and test volume by the computed amount, and differentially opening the slow inlet solenoid valve and the slow outlet solenoid valve for that time duration.

2. The method of claim 1 including repeating step (e) until stabilized pressure in the manifold is within a predetermined range from the target pressure.

3. The method of claim 2 wherein the pressure transducer is a first pressure transducer, the method including operating the processor to read the first pressure transducer during performing of step (b) and step (d), and operating the processor to read a second pressure transducer during performing of step (e), the second pressure transducer being coupled to the processor, the second pressure transducer being coupled to the test volume, the second pressure transducer being substantially more accurate than the first pressure transducer, the second pressure transducer being substantially slower in operation than the first pressure transducer, whereby the first pressure transducer mainly determines overall speed of setting the pressure in the test volume and the second pressure transducer determines the accuracy of the pressure attained in the test volume.

4. The method of claim 1 including operating a processor coupled to a pressure transducer coupled to the manifold and to a plurality of valves including the slow inlet solenoid valve and the slow outlet valve to change the pressure of the manifold by individually opening and closing each of the valves, respectively, and measuring and storing corresponding pressure rates of change associated with each valve.

5. The method of claim 4 including operating the processor to compute a plurality of pressure coefficients associated with each valve to relate pressure measurements and pressure rates of change back to a full scale value.

6. The method of claim 4 including operating the processor to compute and store an offset for the slow inlet solenoid valve and the slow outlet solenoid valve, the offset being a difference in opening times of the slow inlet solenoid valve and the slow outlet solenoid valve such that a pressure change in the manifold is zero when both the slow inlet solenoid valve and the slow outlet solenoid valve are opened.

7. The method of claim 4 including passing a gas flow through a first flow restrictor bypassing the manifold and coupled between an outlet of an inlet flow regulator and an inlet of an outlet flow regulator to limit gas flow in the inlet flow regulator and the outlet flow regulator, the inlet flow regulator and the outlet flow regulator maintaining a relatively constant pressure difference across the slow inlet solenoid valve, the fast inlet solenoid valve, and the slow outlet solenoid valve, the outlet of the inlet flow regulator being coupled to inlets of the fast inlet solenoid valve and the slow inlet solenoid valve, the inlet of the outlet flow regulator being coupled to an outlet of the slow outlet solenoid valve.

8. The method of claim 4 including operating a first flow restrictor coupled between a control diaphragm of the inlet flow regulator and the manifold to delay pressure feedback to that control diaphragm to cause rate of change of pressure of the manifold to remain relatively independent of variations in a test volume coupled to the manifold, and operating a second flow restrictor coupled between a control diaphragm of the outlet flow regulator and the manifold to delay pressure feedback from the manifold to that control diaphragm to cause rate of change of pressure in the manifold to be relatively independent of variations in the test volume.

9. The method of claim 8 including providing a third flow restrictor coupled between an outlet of the slow inlet solenoid valve and the manifold and providing a fourth flow restrictor coupled between an inlet of the slow outlet solenoid valve and the manifold, and adjusting the third and fourth flow restrictors to precisely match flows of gas through the slow inlet solenoid valve and the slow outlet solenoid valve.

10. The method of claim 4 including operating the processor to store a preselected pressure stability value, to repetitively read pressure of the manifold, to repetitively compute pressure rate of change of the manifold, to repetitively compare the pressure rate of change with the stability value, and set and store a stability variable to a level that indicates whether pressure of the manifold is stable or not in accordance with whether the present pressure rate of change is less than the stability value or not.

11. The method of claim 10 including operating the processor to set and store a ready variable to a level indicating that an accurate reading of manifold pressure can be taken if all valves coupled to the manifold are closed, a most recently measured pressure of the manifold is within a preselected hold range, and the stability variable has a value indicating that the pressure of the manifold is stable.

12. The method of claim 4 including operating the processor to read a first manual switch to set and store a preselected hold range.

13. The method of claim 12 including operating the processor to read a plurality of manual switches to set a manifold pressure and set a target pressure equal to the manifold pressure.

14. The method of claim 4 including operating the processor to read a value of a first manual switch to set and store a pressure step size equal to the certain amount.

15. The method of claim 14 including operating the processor to read a value of a pulse switch that causes step (e) to be performed once to thereby change pressure of the manifold by the pressure step size.

16. The method of claim 4 including coupling the processor to a remote computer by an electronic communications link and controlling the processor by means of the remote computer.

17. A method of rapidly, precisely setting and stabilizing the pressure in a test volume, the method comprising the steps of:
   (a) opening an inlet solenoid valve, the inlet solenoid valve coupling a pressurized gas source into a manifold, thereby increasing pressure in the manifold, an outlet solenoid valve coupling the manifold to a reference pressure source;
   (b) determining when the pressure in the manifold has reached a first pressure such that if the inlet solenoid valve is opened for a first preselected time, pressure in the manifold will be equal to a target pressure;
   (c) after the pressure in the manifold has reached the first pressure, closing the inlet solenoid valve;
   (d) after the pressure in the manifold has reached the first pressure, computing an amount of gas needed to be injected into the manifold to increase the pressure in the manifold by a certain amount, based on the present pressure in the manifold and the test volume, and computing a time duration during which the inlet solenoid valve and the outlet solenoid valve must be differentially opened to increase a net amount of gas injected into the manifold and test volume by the computed amount, and differentially opening the inlet solenoid valve and the outlet solenoid valve for that time duration.

18. A method of rapidly, precisely setting and stabilizing the pressure in a volume, the method comprising the steps of:
   (a) providing an inlet solenoid valve device coupling a pressurized gas source into a manifold and an outlet solenoid valve device coupling the manifold to a reference pressure source;
   (b) repetitively opening and closing both the inlet solenoid valve device and the outlet solenoid valve device to cause a change in the pressure in the volume;
   (c) measuring the pressure in the volume;
   (d)) determining that the pressure is in a selected range;
   (e) closing the inlet and outlet solenoid valve devices and maintaining them closed to maintain the pressure at a selected value.

19. A method of rapidly, precisely setting and stabilizing the pressure in a volume, the method comprising the steps of:
   (a) providing an inlet solenoid valve device coupling a pressurized gas source into a manifold and an outlet solenoid valve device coupling the manifold to a reference pressure source;
   (b) repetitively opening and closing both the inlet solenoid valve device and the outlet solenoid valve device to cause a change in the pressure in the volume;
   (c) measuring the pressure in the volume;
   (d) after the pressure in the manifold has reached the pressure, computing an amount of gas needed to be injected into the manifold to increase the pressure in the manifold by a certain amount, based on the present pressure in the manifold and the volume, and computing a time duration during which the inlet solenoid valve device and the outlet solenoid valve device must be differentially opened to increase a net amount of gas injected into the manifold and the volume by the computed amount, and differentially opening the slow inlet solenoid valve device and the slow outlet solenoid valve device for that time duration;
   (e) determining that the pressure is in a selected range;
   (f) closing the inlet and outlet solenoid valve devices and maintaining them closed to maintain the pressure at a selected value,
to thereby prevent action of a controller from influencing the maintained pressure.

20. An apparatus for rapidly, precisely setting and stabilizing the pressure in a test volume, the apparatus comprising in combination:
   (a) a manifold;
   (b) a fast inlet solenoid valve and a slow inlet solenoid valve, the fast inlet solenoid valve and the slow inlet solenoid valve each coupling a pressurized gas source into a manifold, thereby increasing pressure in the manifold;
   (c) an outlet solenoid valve coupling the manifold to a reference pressure source;
   (d) means for determining when the pressure in the manifold has reached a first pressure value such that if the slow inlet solenoid valve is opened for a first preselected time, during which the fast inlet solenoid valve is closed pressure in the manifold will be equal to a target pressure;
   (e) means for closing he fast inlet solenoid valve after the pressure in the manifold has reached the first pressure, resulting in further increasing the pressure in the manifold;
   (f) means for determining when the pressure in the manifold has reached a second pressure such that if the slow inlet solenoid valve is opened for a second preselected time during which the fast inlet solenoid valve is closed, the manifold pressure will be equal to the target pressure;
   (g) means for
      i computing an amount of gas needed to be injected into the manifold to increase the pressure in the manifold by a certain amount, based on the present pressure in the manifold and the test volume,
      ii computing a time duration during which the slow inlet valve and the slow outlet valve must be differentially opened with the fast inlet solenoid valve closed to increase the net amount of gas injected into the manifold and test volume by the computed amount,
   after the pressure in the manifold has reached the second pressure; and
   (h) means for differentially opening the slow inlet solenoid and the slow outlet solenoid valve for that time duration.

21. The apparatus of claim 20 including means for repeating the computing of element (g) and the differential opening of element (h) until a stabilized pressure in the manifold is within a predetermined range of the target pressure.

22. The apparatus of claim 20 including a processor coupled to the slow inlet solenoid valve, the fast inlet solenoid valve, and the outlet solenoid valve, a pressure transducer coupled to the manifold and to a plurality of valves including the slow inlet solenoid valve and the slow outlet solenoid valve, and means for operating the processor to change the pressure of the manifold by individually opening and closing each of the valves, respectively, and measuring and storing corresponding pressure rates of change associated with each valve.

23. The apparatus of claim 22 including means for operating the processor to compute a plurality of pressure coefficients to relate pressure measurements and pressure rates of change back to a full scale value.

24. The apparatus of claim 22 including means for operating the processor to compute and store an offset for the slow inlet solenoid valve and the slow outlet solenoid valve, the offset being a difference in opening times of the slow inlet solenoid valve and the slow outlet solenoid valve such that a pressure change in the manifold is zero when both the slow inlet solenoid valve and the slow outlet solenoid valve are differentially opened using the offset.

25. The apparatus of claim 22 including a first flow restrictor bypassing the manifold and coupled between an outlet of an inlet flow regulator and an inlet of an outlet flow regulator and operating so as to limit gas flow in the inlet flow regulator and the outlet flow regulator, the inlet flow regulator and the outlet flow regulator maintaining a relatively constant pressure difference across the slow inlet solenoid valve, the fast inlet solenoid valve, and the outlet solenoid valve, the outlet of the inlet flow regulator being coupled to inlets of the fast inlet solenoid valve and the slow inlet solenoid valve, the inlet of the outlet flow regulator being coupled to an outlet of the outlet solenoid valve.

26. The apparatus of claim 22 including a first flow restrictor coupled between a control diaphragm of the inlet flow regulator and the manifold and operating so as to delay pressure feedback to that control diaphragm to cause rate of change of pressure of the manifold to remain relatively independent of variations in a test volume coupled to the manifold, and operating a second flow restrictor coupled between a control diaphragm of the outlet flow regulator and the manifold and operating so as to delay pressure feedback from the manifold to that control diaphragm to cause rate of change of pressure in the manifold to be relatively independent of variations in the test volume.

27. The apparatus of claim 26 including a third flow restrictor coupled between an outlet of the slow inlet solenoid valve and the manifold and a fourth flow restrictor coupled between an inlet of the slow outlet solenoid valve and the manifold, the third and fourth flow restrictors being adjusted to precisely match flows of gas through the slow inlet solenoid valve and the slow outlet solenoid valve.

28. The apparatus of claim 22 including means for operating the processor to store a preselected pressure stability value, to repetitively read pressure of the manifold, to repetitively compute pressure rate of change of the manifold, to repetitively compare the pressure rate of change with the stability value, and set and store a stability variable to a level that indicates whether pressure of the manifold is stable or not in accordance with whether the present pressure rate of change is less than the stability value or not.

29. The apparatus of claim 28 including means for operating the processor to set and store a ready variable to a level indicating that an accurate reading of manifold pressure can be taken if all valves coupled to the manifold are closed, a most recently measured pressure of the manifold is within a preselected hold range, and the stability variable has a value indicating that the pressure of the manifold is stable.

30. The apparatus of claim 22 including a first manual switch to set a preselected hold range, and means for operating the processor to read the first manual switch and set and store the preselected hold range.

31. The apparatus of claim 30 including a plurality of manual switches to set a manifold pressure and set a target pressure equal to the manifold pressure, and means for operating the processor to read the plurality of manual switches to set the manifold pressure and set the target pressure equal to the manifold pressure.

32. The apparatus of claim 22 including a first manual switch to set a pressure step size equal to the certain amount, and means for operating the processor to read a value of the first manual switch to set and store the pressure step size equal to the certain amount.

33. The apparatus of claim 32 including a pulse switch that causes the computing of element (g) and the differential opening of element (h) to be performed once to thereby change pressure of the manifold by the pressure step size.

34. The apparatus of claim 22 including a joystick coupled to the processor, the processor operating in response to the joystick to set a manifold pressure and set a target pressure equal to the manifold pressure.

35. The apparatus of claim 34 wherein the processor operates in response to the joystick to set a pressure step size to any value in a continuous range.

36. An apparatus for rapidly, precisely setting and stabilizing the pressure in a test volume, the apparatus comprising in combination:
(a) a manifold;
(b) an inlet solenoid valve, the inlet solenoid valve coupling a pressurized gas source into a manifold, thereby increasing pressure in the manifold;
(c) an outlet solenoid valve coupling the manifold to a reference pressure source;
(d) means for determining when the pressure in the manifold has reached a first pressure value such that if the inlet solenoid valve is opened for a first preselected time, pressure in the manifold will be equal to a target pressure;
(e) means for closing the inlet solenoid valve after the pressure in the manifold has reached the first pressure;
(f) means for
 i computing an amount of gas needed to be injected into the manifold to increase the pressure in the manifold by a certain amount, based on the present pressure in the manifold and the test volume,
 ii computing a time duration during which the inlet valve and the outlet valve must be differentially opened to increase the net amount of gas injected into the manifold and test volume by the computed amount,
after the pressure in the manifold has reached the first pressure; and (g) means for differentially opening the inlet solenoid and the outlet solenoid valve for that time duration.

37. An apparatus for rapidly, precisely setting and stabilizing the pressure in a volume, comprising in combination:
  (a) a manifold;
  (b) an inlet solenoid valve coupling a pressurized gas source into the manifold;
  (c) an outlet solenoid valve coupling the manifold to a reference;
  (d) means for repetitively opening and closing both the inlet solenoid valve and the outlet solenoid valve to cause a change in the pressure in the volume;
  (e) means for measuring the pressure in the volume;
  (f) means for determining that the pressure is in a selected range; and
  (g) means for closing the inlet and outlet solenoid valves and maintaining them closed to maintain the pressure at a selected value.

38. A method of rapidly, precisely setting and stabilizing the pressure in a test volume, the method comprising the steps of:
  (a) opening an inlet solenoid valve, the inlet solenoid valve coupling a gas pressure source or reference to a manifold, thereby changing pressure in the manifold;
  (b) determining when the pressure in the manifold has reached a first pressure such that if the inlet solenoid valve is opened for a first preselected time, pressure in the manifold will be equal to a target pressure;
  (c) after the pressure in the manifold has reached the first pressure, closing the inlet solenoid valve;
  (d) after the pressure in the manifold has reached the first pressure, computing an amount of gas needed to be moved into or out of the manifold to change the pressure in the manifold by a certain amount, based on a present pressure in the manifold and the test volume, and computing a time duration during which the inlet solenoid valve and an outlet solenoid valve must be differentially opened to change the net amount of gas injected into the manifold and test volume by the computed amount, and differentially opening the inlet solenoid and the outlet solenoid valve for that time duration.

39. A method of rapidly, precisely setting and stabilizing the pressure in a test volume, the method comprising the steps of:
  (a) opening a fast outlet solenoid valve and a slow outlet solenoid valve, the fast outlet solenoid valve and the slow outlet solenoid valve coupling a pressurized manifold to a reference pressure source,, thereby decreasing pressure in the manifold;
  (b) determining when pressure in the manifold has reached a first pressure such that if the slow inlet solenoid valve is opened for a first preselected time during which the fast outlet solenoid valve is closed, pressure in the manifold will be equal to a target pressure;
  (c) after the pressure in the manifold has reached the first pressure, closing the fast outlet solenoid valve, resulting in further decreasing the pressure in the manifold more slowly than in step (a);
  (d) determining when the pressure in the manifold has reached a second pressure such that if the slow inlet solenoid valve is opened for a second preselected time during which the fast outlet solenoid valve is closed, the manifold pressure will be equal to the target pressure;
  (e) after the pressure in the manifold has reached the second pressure, computing an amount of gas needed to be injected into the manifold to decrease the pressure in the manifold by a certain amount, based on the present pressure in the manifold and the first volume, and computing a time duration during which the slow inlet valve and the slow outlet valve must be differentially opened during which the fast outlet solenoid valve is closed to decrease the net amount of gas injected into the manifold and test volume by the computed amount, and differentially opening the slow inlet solenoid and the slow outlet solenoid valve for that time duration.

40. The method of claim 39 including the steps of opening each of the fast inlet, slow inlet, and slow outlet solenoid valves, one at a time, to produce corresponding pressure changes, and computing corresponding pressure gradients by dividing the pressure changes by the intervals during which the fast inlet, slow inlet, and slow outlet solenoid valves are open.

41. An apparatus for setting pressure in a manifold, comprising in combination:
  (a) an inlet solenoid valve device coupled to the manifold, an outlet solenoid device coupled to the manifold, and a pressure transducer coupled to the manifold;
  (b) a processor coupled to the inlet solenoid valve device, the outlet solenoid valve device, and the pressure transducer;
  (c) an inlet flow regulator having an inlet coupled to a pressurized gas source and an outlet coupled to an inlet of the inlet solenoid valve device, and an outlet flow regulator having an inlet coupled to an outlet of the outlet solenoid valve device and an outlet coupled to a reference pressure source, the inlet flow regulator and the outlet flow regulator maintaining a relatively constant pressure difference across the inlet solenoid valve and the outlet solenoid valve;
  (d) means for operating the processor to compute and store an offset for the inlet solenoid valve device and the outlet solenoid valve device, the offset being a difference in opening times of the inlet solenoid valve device and the outlet solenoid valve device such that a pressure change in the manifold is zero when both the inlet solenoid valve device and the outlet solenoid valve device are differentially opened using the offset,
whereby the offset is relatively unchanged for a substantial range of pressure in the manifold.

* * * * *